(12) United States Patent
Hoshii

(10) Patent No.: US 7,961,230 B2
(45) Date of Patent: Jun. 14, 2011

(54) IMAGE PROCESSING DEVICE, IMAGE PROCESSING PROGRAM, IMAGE PROCESSING SYSTEM, AND IMAGE PROCESSING METHOD

(75) Inventor: Jun Hoshii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 509 days.

(21) Appl. No.: 12/201,474

(22) Filed: Aug. 29, 2008

(65) Prior Publication Data

US 2009/0059029 A1 Mar. 5, 2009

(30) Foreign Application Priority Data

Aug. 30, 2007 (JP) ................................. 2007-224872

(51) Int. Cl.
*H04N 5/262* (2006.01)
(52) U.S. Cl. ..................................... 348/239; 348/207.2
(58) Field of Classification Search ............... 348/207.2, 348/239; 382/117–118; 358/1.1, 1.2, 3.12
See application file for complete search history.

(56) References Cited

U.S. PATENT DOCUMENTS

| 2005/0175257 A1* | 8/2005 | Kuroki .......................... 382/278 |
| 2008/0253622 A1* | 10/2008 | Tosa et al. ..................... 382/117 |
| 2008/0298643 A1* | 12/2008 | Lawther et al. ............... 382/118 |

FOREIGN PATENT DOCUMENTS

| JP | 2001-209817 | 8/2001 |
| JP | 2004-264893 | 9/2004 |
| JP | 2004-318204 | 11/2004 |
| JP | 2007-139535 | 6/2007 |

* cited by examiner

*Primary Examiner* — Tuan Ho
(74) *Attorney, Agent, or Firm* — DLA Piper LLP (US)

(57) ABSTRACT

There is provided a configuration including a subject detection section adapted to detect an image of a specific subject in a target image, a ratio information acquisition section adapted to acquire ratio information representing a ratio between a size of the subject captured via a monocular lens used for taking an image of the target image and a size of the subject sensed by both eyes, and a transformation processing section adapted to execute image transformation on an area including the image of the subject on the target image based on the ratio information obtained by the ratio information acquisition section.

11 Claims, 29 Drawing Sheets

$$\begin{cases} Sd : Ww = f : Wx & \cdots (1) \\ Ww : Wf = Wwi : Wfi & \cdots (2) \end{cases}$$

⇩

$$Sd = (Wwi \times Wf \times f) / (Wfi \times Wx) \quad \cdots (3)$$

420

IMAGE PROCESSING DEVICE, IMAGE PROCESSING PROGRAM, IMAGE PROCESSING SYSTEM, AND IMAGE PROCESSING METHOD

The entire disclosure of Japanese Patent Application No. 2007-224872, filed Aug. 30, 2007, is expressly incorporated herein by reference.

BACKGROUND

1. Technical Field

The present invention relates to an image processing technology capable of performing transformation of an image.

2. Related Art

In JP-A-2004-318204 (Patent Document 1), there is described an image processing technology for transforming an image directed to digital images. The Patent Document 1 discloses image processing in which an area (an area representing an image of a cheek) of an image of a face is set as a correction area, the correction area is divided into a plurality of sub-areas along a predetermined pattern, and the image is enlarged or shrunk with scale factors set respectively for the sub-areas, thereby transforming the shape of the face.

Here, a human sometimes receives an impression, which is different from an impression received when viewing a certain object directly, from an image (a picture or an image on a monitor) obtained by shooting the object. In particular, in some cases, the object in the impression when viewed as an image seems "thicker" than the object in the impression when viewed as the real thing, which causes uncomfortable feeling to the observer.

However, there has not been known image transformation processing for eliminating the divergence between the impression a human receives when viewing the object directly and the impression when viewing the image displaying the same object.

SUMMARY

An advantage of some aspects of the invention is to provide an image processing device, an image processing program, an image processing system, and an image processing method capable of obtaining an image providing an impression as similar as possible to the impression a human receives when viewing the object directly.

In an image processing device according to an aspect of the invention, a subject detection section detects an image of a specific subject in a target image, and a ratio information acquisition section acquires ratio information representing a ratio between a size of the subject captured via a monocular lens used for taking an image of the target image and a size of the subject sensed by both eyes. Further, a transformation processing section executes image transformation on an area including the image of the subject on the target image based on the ratio information obtained. Therefore, according to this aspect of the invention, the transformation process is executed on the area including the image of the subject on the target image based on the ratio between the size of the subject captured via the monocular lens and the size of the subject sensed by the both eyes. Therefore, it is possible to obtain the image providing a similar impression as possible to the impression received by a human who views the subject directly.

It is also possible that the ratio information acquisition section overlaps a left eye sensing range representing a size of the subject sensed by a left eye and a right eye sensing range representing a size of the subject sensed by a right eye so as to match a point on the left eye sensing range corresponding to a target point on the subject and a point on the right eye sensing range corresponding to the target point on the subject each other, and uses a range common to the left eye sensing range and the right eye sensing range as the size of the subject sensed by the both eyes. According to this configuration, the size of the subject sensed by the both eyes can accurately be obtained using the mechanism with which the human recognizes the size of a object by eye observation.

The image processing device further includes a size information acquisition section adapted to acquire a first subject size information representing an actual size of the subject, and a distance information acquisition section adapted to acquire subject distance information representing a distance from the monocular lens to the subject. Further, it is also possible that the ratio information acquisition section calculates the size of the subject captured via the monocular lens based on the first subject size information and the subject distance information, and calculates the left eye sensing range and the right eye sensing range based on the first subject size information, the subject distance information, and both-eye distance information defined previously and representing a distance between the left eye and the right eye. According to this configuration, using the positional relationship between the subject having the size represented by the first subject size information, a monocular lens disposed at the position having a distance represented by the subject distance information with the subject, and the left and right eyes disposed respectively on the both sides of the monocular lens having a distance represented by the subject distance information with the subject, and having a distance represented by the both-eye distance information with each other, the size of the subject captured via the monocular lens, the left eye sensing range, and the right eye sensing range can easily be calculated by the geometric calculation.

Further it is also possible that the ratio information acquisition section generates a table defining ratio information corresponding respectively to a plurality of combinations of the first subject size information and the subject distance information, and obtains the ratio information corresponding to the first subject size information acquired by the size information acquisition section and the subject distance information acquired by the distance information acquisition section by looking up the table. According to this configuration, by looking up the table, the ratio information corresponding to the first subject size information and the subject distance information, both of which can take various values, can easily be obtained.

It is also possible that the distance information acquisition section acquires a second subject size information representing a size of an image of the subject in the target image to the target image and a third information capable of specifying a field angle of the target image, and estimates the subject distance information based on the first subject size information acquired by the size information acquisition section, the second subject size information, and the third information. According to this configuration, the distance from the monocular lens to the subject, which is difficult to obtain in the related art, can easily be obtained.

Here, it is also possible that the ratio information acquisition section acquires different ratio information between regions of the subject, and the transformation processing section executes the image transformation based on the different ratios between areas corresponding to the regions of the subject in the area determined as the target of the image transformation. The difference between the impression a human receives when viewing the object directly and the impression the human receives when viewing the object as an image is varied in accordance with the size of the object. According to this configuration, since the image transformation is executed with different ratio between the areas corresponding respectively to the regions of the subject when executing the image transformation, it is possible to modify the image having the different sizes between the regions into the shape extremely close to the look by a human.

As an example of the image transformation process, the transformation processing section executes the image transformation so as to shrink the subject in a lateral width direction based on the ratio information. Specifically, since the most remarkable difference between the impressing a human receives when viewing the subject directly and the impression the human receives when viewing the subject as an image is "thickness," in order for eliminating the difference in thickness, the transformation process for shrinking the subject in the lateral width direction based on the ratio information described above is executed.

The portion of the figure particularly attracts attention in the target image, and it is not preferable for the user that the face of the figure looks fatter than life. Therefore, the subject detection section can be arranged to detect an image of a figure as the image of the specific subject. According to this configuration, it is preferable that the transformation process can be executed on the area including the image of the figure.

Although hereinabove the technical concept according to the invention is explained as the image processing device, the invention includes an image processing method provided with the steps corresponding to the elements included in the image processing device described above, and further an image processing program for making the computer execute the function corresponding to the elements included in the image processing device described above as aspects thereof. Further, it is also possible to realize the process realized by the image processing device by a system composed of a plurality of devices.

As an example of this case, an image processing system includes a first device including a monocular lens, a subject detection section adapted to detect an image of a specific subject in a target image captured via the monocular lens, an image taking section adapted to take an image of the target image captured via the monocular lens, and an output section adapted to output image data of the target image taken, and a second device including an input section adapted to input the image data of the target image output from the first device, a ratio information acquisition section adapted to acquire ratio information representing a ratio between a size of the subject captured via a monocular lens and a size of the subject sensed by both eyes, and a transformation processing section adapted to execute image transformation on an area including the image of the subject in the image data input based on the ratio information obtained by the ratio information acquisition section.

DESCRIPTION OF EXEMPLARY EMBODIMENTS

Hereinafter, some embodiments of the present invention will be explained along the following order.
1. First Embodiment
1-1. Schematic Configuration of the Device
1-2. Image Generation Process
1-3. Face Shape Correction Printing Process
2. Other Embodiments

1. First Embodiment

1-1. Schematic Configuration of the Device

Figure 1:
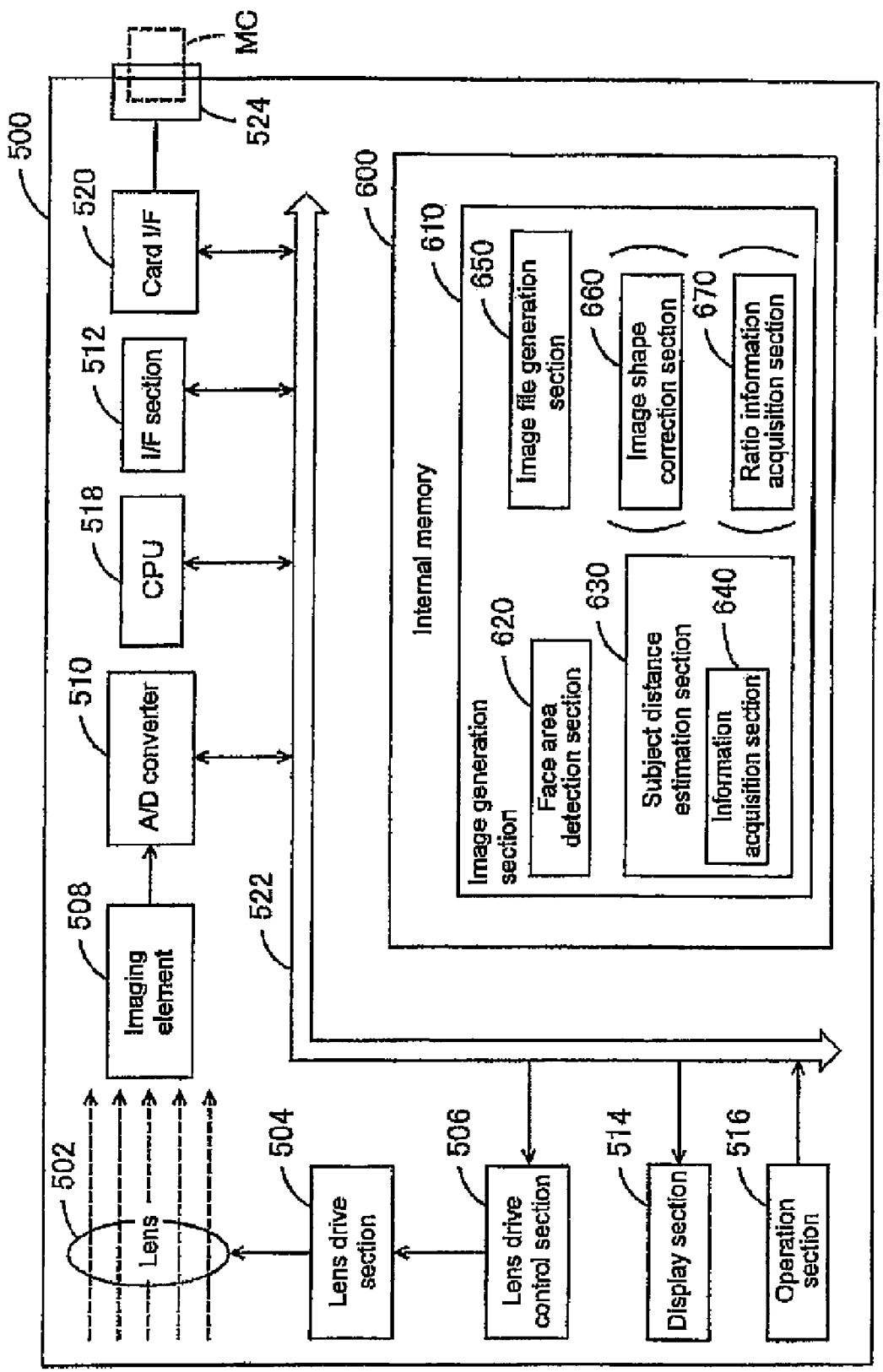
FIG. 1 is an example of an explanatory diagram schematically showing a configuration of a DSC 500 as an image processing device.

FIG. 1 is an explanatory diagram schematically showing a configuration of a digital still camera 500 according to a first embodiment (the present embodiment). The digital still camera (hereinafter referred to as "DSC") 500 functions as an imaging device (an image generation device) for taking an image of a target to generate the image, and also functions as an image processing device for executing image processing on the image thus generated.

The DSC 500 is provided with a lens (a monocular lens) 502, a lens drive section 504 for driving the lens 502 to adjust the position of the focal point (focus) and the focal distance thereof, a lens drive control section 506 for controlling the lens drive section 504, an imaging element 508 for converting the light input to an acceptance surface via the lens 502 into an electric signal, an A/D converter 510 for executing A/D conversion on the electric signal output from the imaging element 508, an interface (I/F) section 512 for communicating information with external equipment, a display section 514 formed of a liquid crystal display, an operation section 516 formed of a button or a touch panel, a CPU 518 for controlling each section of the DSC 500, an internal memory 600 formed of a ROM and a RAM, and a card interface (card I/F) 520. The card I/F 520 is an interface for communicating data with a memory card MC inserted in a card slot 524. The imaging element 508 is formed, for example, of CCD. The constituents of the DSC 500 are connected to each other via a bus 522.

The internal memory 600 stores an image generation section 610. The image generation section 610 is a computer program for executing an image generation process described later on a predetermined operating system. The CPU 518 retrieves the program from the internal memory 600 and executes the program, thereby realizing the function of the image generation section 610.

The image generation section 610 basically includes a face area detection section 620, a subject distance estimation section 630, and an image file generation section 650 as program modules. Further, the subject distance estimation section 630 includes an information acquisition section 640. The functions of these sections will be described in detail in the explanation of the image generation process described later. The face area detection section 620 is for detecting an image of a figure (more precisely, an image including a face of the figure) as a subject, and can also be called "a subject detection section."

Figure 2:
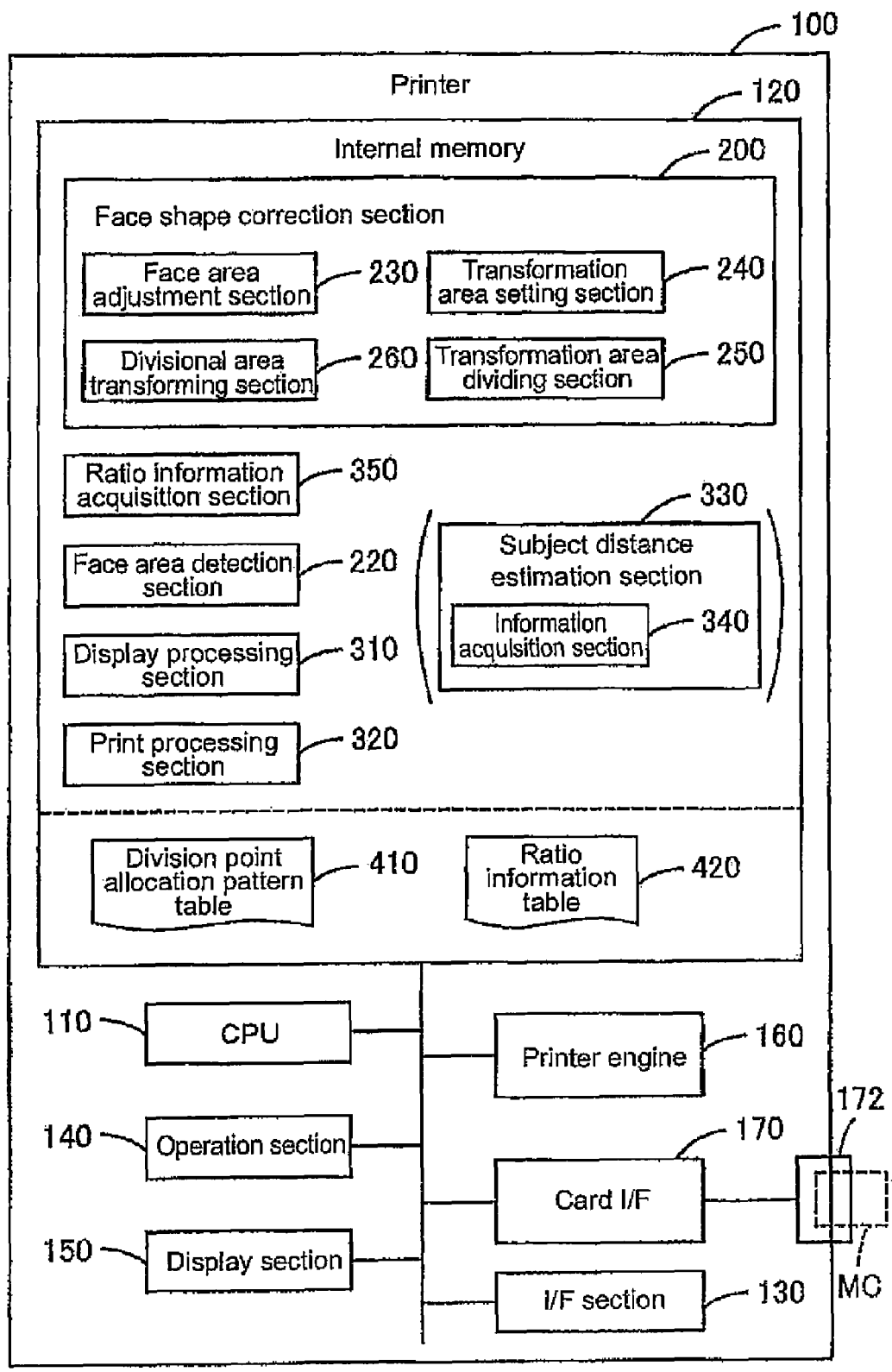
FIG. 2 is an example of an explanatory diagram schematically showing a configuration of a printer 100 as an image processing device.

FIG. 2 is an explanatory diagram schematically showing the configuration of an image output apparatus in the first embodiment. The image output apparatus in the present embodiment is a printer 100. The printer 100 is a color inkjet printer also functioning as an image processing device for executing image processing on the image data acquired from the memory card MC or the like, printing an image based on the image data, and compatible with so-called direct printing. The printer 100 is provided with a CPU 110 for controlling each section of the printer 100, an internal memory 120 formed, for example, of a ROM and a RAM, an operation section 140 formed of buttons or a touch panel, a display section 150 formed of a liquid crystal display, a printer engine 160, a card I/F 170, and an I/F section 130 for communicating information with an external device. The constituents of the printer 100 are connected to each other via a bus.

The printer engine 160 is a printing mechanism for performing printing based on print data. The card I/F 170 is an interface for communicating data with a memory card MC inserted in a card slot 172. In the present embodiment, the memory card MC inserted in the card slot 172 stores an image file including image data as RGB data. In the present embodiment, the image file is a file generated by the DSC 500 in accordance with the Exchangeable Image File Format (Exif) standard, and includes additional data such as the aperture, the shutter speed, and the focal distance in the imaging process in addition to the image data generated in the imaging process. The printer 100 acquires the image file stored in the memory card MC via the card I/F 170. In other words, the printer 100 can be provided with the image file from the DSC 500 using the memory card MC as a medium. It is obvious that as the medium for providing the image file, various kinds of mediums can be used besides the memory card MC, and it is possible to connect the I/F section 512 of the DSC 500 and the I/F section 130 of the printer 100 to each other with a cable to communicate the image file.

The internal memory 120 basically stores a face shape correction section 200, a face area detection section 220, a display processing section 310, a print processing section 320, and a ratio information acquisition section 350. The face shape correction section 200, the face area detection section 220, and the ratio information acquisition section 350 are computer programs for respectively executing a face shape correction process, the face area detection process, and the ratio information acquisition process described later on a predetermined operating systems. The display processing section 310 is a display driver for controlling the display section 150 to display the menu of the processes and messages on the display section 150. The print processing section 320 is a computer program for generating the print data from the image data, and controlling the printer engine 160 to execute printing of the image based on the print data. The CPU 110 retrieves these programs from the internal memory 120 and executes the programs, thereby realizing the functions of these sections, respectively.

The face shape correction section 200 includes a face area adjustment section 230, a transformation area setting section 240, a transformation dividing section 250, and a divisional area transforming section 260 as program modules. The functions of these sections will be described in detail in the explanation of the face shape correction printing process described later. It should be noted that the transformation area dividing section 250 and the divisional area transforming section 260 execute transformation of an image as described later. Therefore, the transformation area dividing section 250 and the divisional area transforming section 260 can collectively be called "a transformation processing section."

The internal memory 120 also stores a division point allocation pattern table 410. The content of the division point allocation pattern table 410 will also be described in detail in the explanation of the face shape correction printing process described later. Further, there are some cases in which the internal memory 120 stores a ratio information table 420. The content of the ratio information table 420 will also be described later.

Hereinafter, the present embodiment is explained assuming that the image processing system is formed of the DSC 500 and the printer 100 as described above. In this context, the DSC 500 corresponds to an example of a first device according to the present invention, and the printer 100 corresponds to an example of a second device according to the present invention.

1-2. Image Generation Process

The processes executed by the DSC 500 out of the processes of the image processing system will firstly be explained.

Figure 3:
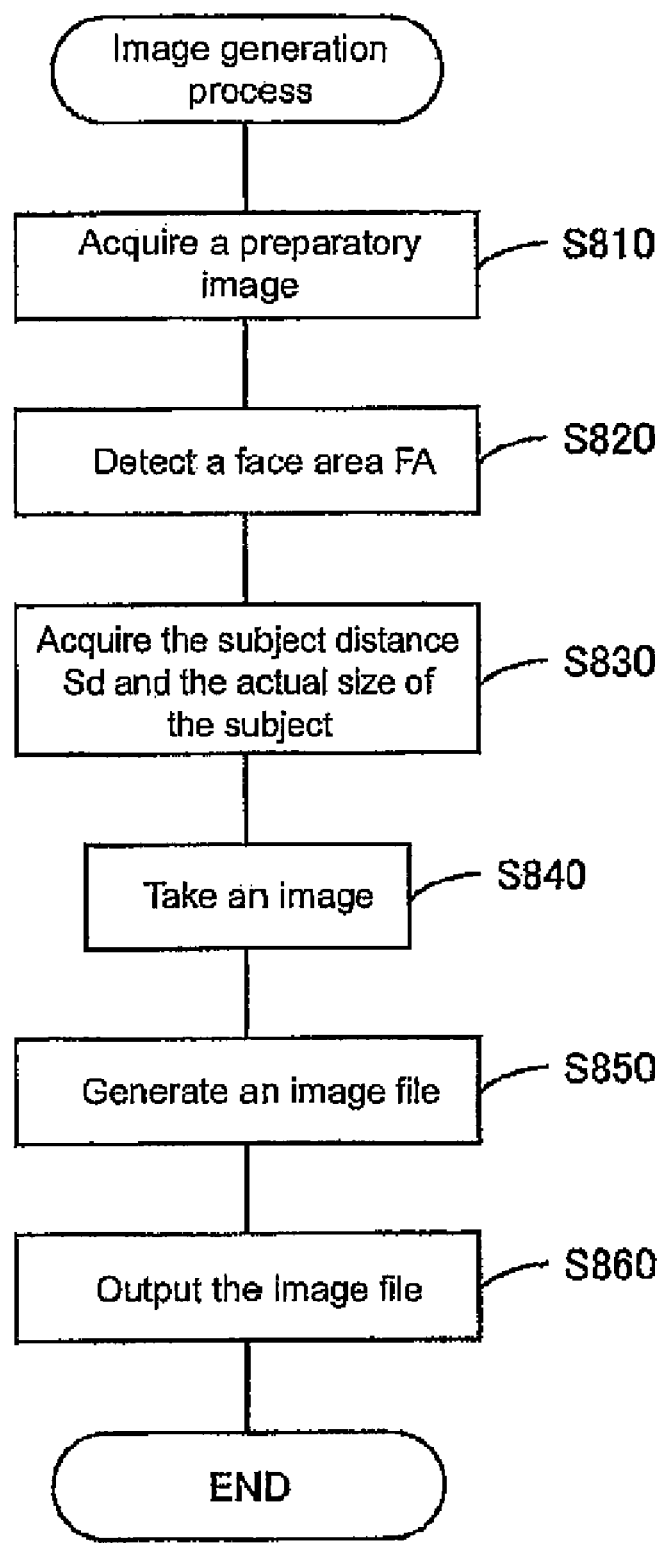
FIG. 3 is an example of a flowchart showing flow of an image generation process.

FIG. 3 is a flowchart showing flow of the image generation process executed by the DSC 500 of the present embodiment. In the step S810 (hereinafter "step" is omitted), the image generation section 610 (FIG. 1) acquires a preparatory image. Although the image is called a preparatory image here which denotes the image used in various processes executed before the imaging process, since the content as an image is basically the same as a target image described later, it is possible to replace the term "preparatory image" with the term "target image." The image generation section 610 controls the lens 502, the imaging element 508, and the A/D converter 510 to acquire the preparatory image. It should be noted that in the case in which the display section 514 is used as a viewfinder in the imaging process, the preparatory image is displayed on the display section 514.

In the S820, the face area detection section 620 (FIG. 1) detects the face area FA in the preparatory image. Here, the face area FA denotes an area on the preparatory image, and includes an image of at least a part a face. The detection of the face area FA is executed using a face detection method known to the public such as a method (see JP-A-2004-318204) by pattern matching using a template.

Figure 4:
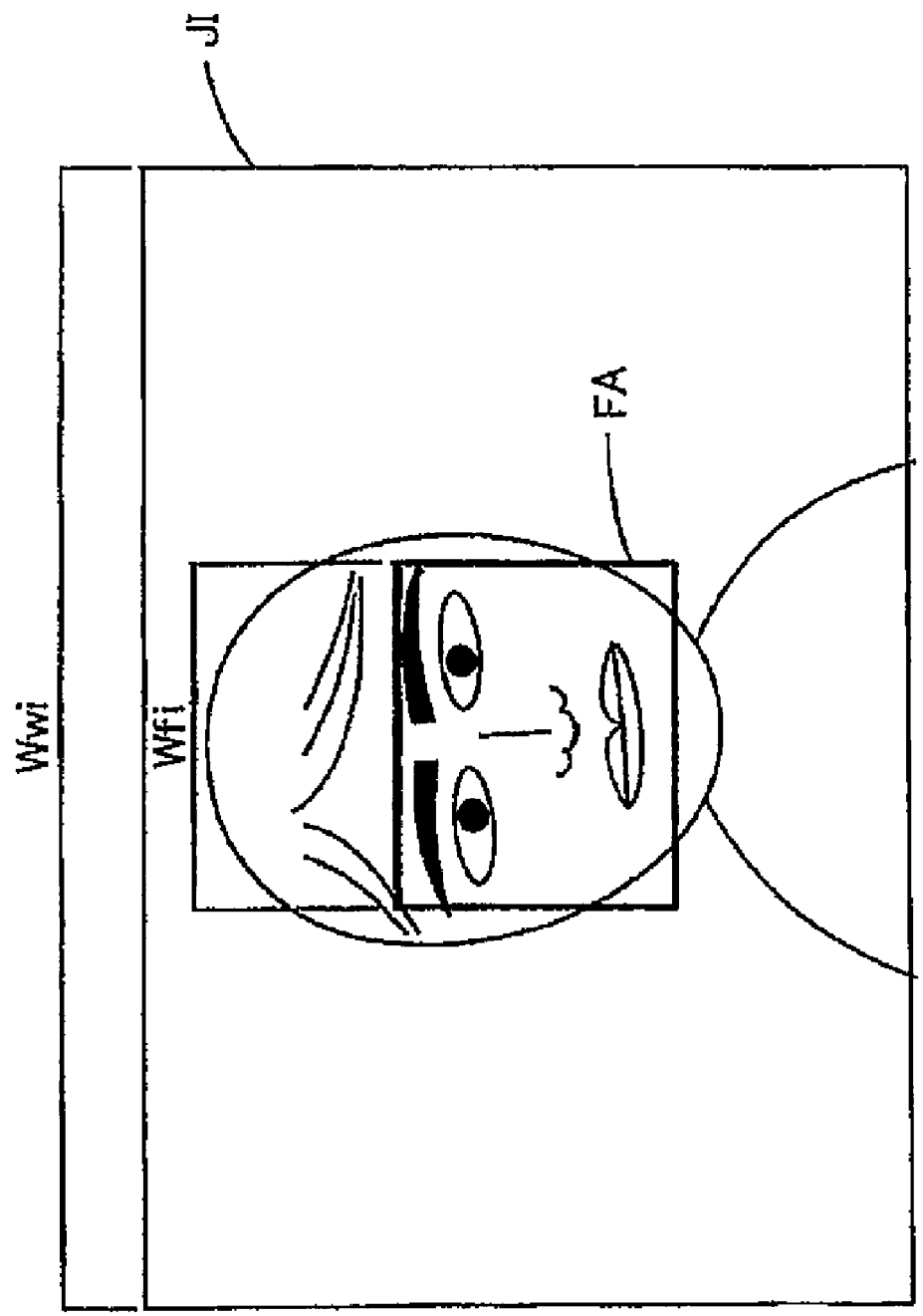
FIG. 4 is an explanatory diagram showing an example of a result of detection of a face area FA.

FIG. 4 is an explanatory diagram showing an example of a result of the detection of the face area FA. In the example shown in FIG. 4, the preparatory image JI includes an image of a figure. Therefore, in the S820, the face area FA of the figure is detected from the preparatory image JI. As shown in FIG. 4, the face area FA is a rectangular area including the image of both eyes, a nose, and a mouth. It should be noted that the face area detection section 620 outputs the information (e.g., coordinates of the four apexes of the face area FA) capable of specifying the location of the face area FA in the preparatory image JI as a result of the detection of the face area FA. Further, as shown in FIG. 4, in the present embodiment, it is assumed that the width of the preparatory image JI is represented as Wwi (pixels), and the width of the face area FA is represented as Wfi (pixels).

It should be noted that in the case in which the face area FA is not detected in the detection of the face area FA of the S820, the user is notified accordingly via the display section 514. On this occasion, it is possible to detect other subjects than a figure, or to execute another process of detecting the face area FA using another face detection method.

In the S820, the face area FA is detected from the preparatory image JI by the pattern matching using the template. The face detection method known to the public such as the method by the pattern matching using the template is, in general, not for detecting the position and the tilt (angle) of the entire face or regions (e.g., an eye, a mouth) of the face in detail, but for setting the area thought to roughly include the image of a face in the preparatory image JI as the face area FA.

In the S830, the subject distance estimation section 630 (FIG. 1) estimates and acquires the subject distance Sd in the preparatory image JI. The subject distance Sd denotes the distance from the DSC 500 (more specifically, a principal point of the lens 502 of the DSC 500) to the subject when acquiring the preparatory image JI. In the present embodiment, a face of a figure is set as the specific subject. Therefore, the subject distance Sd in the present embodiment corresponds to the distance from the DSC 500 to the face of the figure. The subject distance estimation section 630 for estimating such a subject distance Sd can be called "a distance information acquisition section." Further, in the S830, the information representing the actual size of the subject is also acquired in the estimation process of the subject distance Sd.

Figure 5:
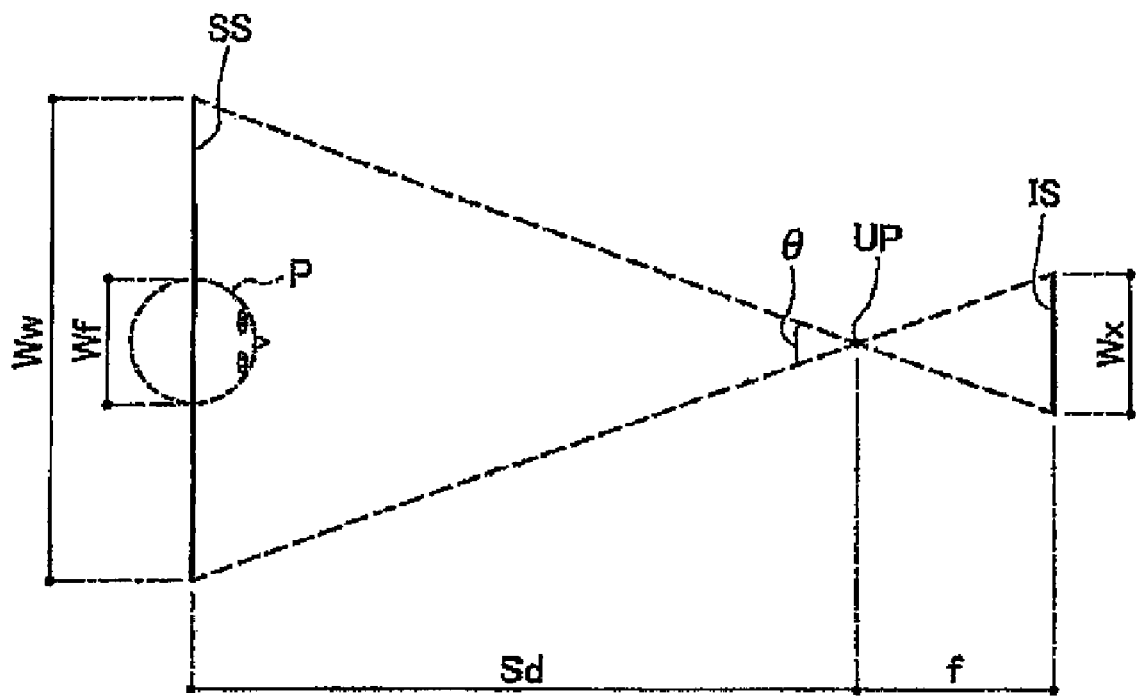
FIG. 5 is an example of an explanatory diagram showing a method of estimating a subject distance Sd.

FIG. 5 is an explanatory diagram showing a method of estimating the subject distance Sd. FIG. 5 shows a positional relationship between the imaging surface IS of the DSC 500 and the face of the figure P as the subject when acquiring the preparatory image JI. As shown in FIG. 5, the subject distance Sd as the distance between the principal point UP of the lens 502 and the face of the figure P is determined from the width Ww and the field angle $\theta$ of the imaging range on a surface (hereinafter referred also to as "a subject surface SS") including the position of the face of the figure P and parallel to the imaging surface IS. Further, the field angle $\theta$ is specified by the relationship between the focal distance f of the lens 502 and the width Wx of the imaging surface IS. Therefore, the following formula 1 is satisfied.

$$Sd:Ww=f:Wx \tag{1}$$

Further, the width Ww of the imaging range in the subject surface SS is specified in accordance with the size which the image of the face of the figure P occupies in the preparatory image JI (FIG. 4). Therefore, it is conceivable that the ratio between the width Ww and the width Wf of the face of the figure P in the subject surface SS is equal to the ratio between the width Wwi of the entire image and the width Wfi of the face area FA in the preparatory image JI (see the formula 2 below).

$$Ww:Wf=Wwi:Wfi \tag{2}$$

The following formula 3 is obtained from the formulas 1 and 2.

$$Sd=(Wwi \times Wf \times f)/(Wfi \times Wx) \tag{3}$$

The information acquisition section 640 (FIG. 1) of the subject distance estimation section 630 acquires the information necessary for calculation of the subject distance Sd using the formula 3. Specifically, the information acquisition section 640 calculates the value (the number of pixels) of the entire width Wwi of the preparatory image JI and the value (the number of pixels) of the width Wfi of the face area FA. The calculation of the width Wfi of the face area FA is performed by, for example, calculating the distance between the two apexes of the face area FA using the coordinates of the two apexes. It should be noted that in the present embodiment, the value of the entire width Wwi of the preparatory image JI and the value of the width Wfi of the face area FA correspond to the information representing the size of the image of the face with respect to the size of the preparatory image JI, and correspond to an example of a second subject size information in the present invention.

The information acquisition section 640 also acquires an approximated value (e.g., 200 mm) of the width (the actual size of the face) of the face of a typical figure previously determined and stored in the internal memory 600 (FIG. 1) as the value of the width Wf of the face of the figure P. The value of the width Wf of the face of the figure P is a kind of information representing the actual size of the subject, and corresponds to a first subject size information of the present invention. In this context, the information acquisition section 640 corresponds to a size information acquisition section in the present invention.

Further, the information acquisition section 640 acquires the value of the focal distance f of the lens when acquiring the preparatory image JI and the value of the width Wx of the imaging surface IS. The focal distance f acquired here is the actual focal distance of the DSC 500. It should be noted that it is possible to acquire the focal distance of the value corresponding to the 35 mm film as the focal distance f instead thereof, and to acquire the value (=36 mm) of the width of the mm film set previously as the width Wx of the imaging surface IS. In the present embodiment, the value of the focal distance f of the lens and the value of the width Wx of the imaging surface IS correspond to the information capable of specifying the field angle θ of the preparatory image (the target image), and correspond to a third information in the present invention.

The subject distance estimation section 630 calculates (estimates) the subject distance Sd using the information (the value of the entire width Wwi of the preparatory image JI, the value of the width Wfi of the face area FA, the value of the width Wf of the face of the figure P, the value of the focal distance f of the lens, and the value of the width Wx of the imaging surface IS) described above thus acquired by the information acquisition section 640, and the formula 3 described above.

In the S840, the image generation section 610 generates image data by imaging. Specifically, the imaging is executed in response to clicking the shutter. On this occasion, the image generation section 610 controls the lens 502, the lens drive section 504, and the lens drive control section 506 to execute automatic focusing, and then executes imaging after specifying the principal subject. Specifically, the image generation section 610 acquires the image by imaging while moving the focal point within a predetermined focal range, and takes the focus on the position corresponding to the image having the highest contrast out of the images thus acquired.

In the S850, the image file generation section 650 generates the image file including the image data generated by imaging, the subject distance Sd estimated in the S830, the value of the width Wf of the face of the figure P, and so on. The image file is generated as a file compliant to, for example, the Exif standard, and the subject distance Sd, the value of the width Wf of the face, and so on are attached to the image file as additional data. Further, in the present embodiment, the information (the coordinates of the four apexes of the face area FA) capable of specifying the position of the face area FA, which is obtained when the face area FA is detected in the S820 described above, is also included in the image file as the additional data. The additional data is appropriately used in the processes executed in the printer 100 side.

In the S860, the image generation section 610 outputs the image file thus generated. Here, "output" denotes an output (storage) to the memory card MC via the card I/F 520, in a simple sense. Alternatively, in the case in which the DSC 500 is connected to the external equipment (the printer 100) via the I/F section 512, it denotes an output to the outside via the I/F section 512. In this context, it can be said that the image generation section 610 is also provided with the function as an output section.

As explained above, in the DSC 500 of the present embodiment, the subject distance Sd in the preparatory image (the target image) can be estimated by the formula 3 described above using the value of the entire width Wwi of the preparatory image (the target image), the value of the width Wfi of the face area FA, the value of the width Wf of the face of the figure P, the value of the focal distance f of the lens, and the value of the width Wx of the imaging surface IS.

It should be noted that in the explanation described above, it is assumed that the image file generated in the S850 includes the data (i.e., the data representing the subject distance Sd in the preparatory image) representing the subject distance Sd acquired in the S830. However, it is also possible that the estimation of the subject distance Sd is newly executed on the image generated by imaging in the S840, and the data representing the subject distance is included in the image file.

1-3. Face Shape Correction Printing Process

Then, the processes executed by the printer 100 out of the processes of the image processing system will now be explained.

The printer 100 executes printing of the image based on the image file and so on stored in the memory card MC. When the memory card MC inserted in the card slot 524 of the DSC 500 described above is pulled out from the card slot 524, and then inserted in the card slot 172 of the printer 100, the display processing section 310 displays the user interface including the thumbnail description of the image files stored in the memory card MC by the DSC 500 on the display section 150.

Figure 6:
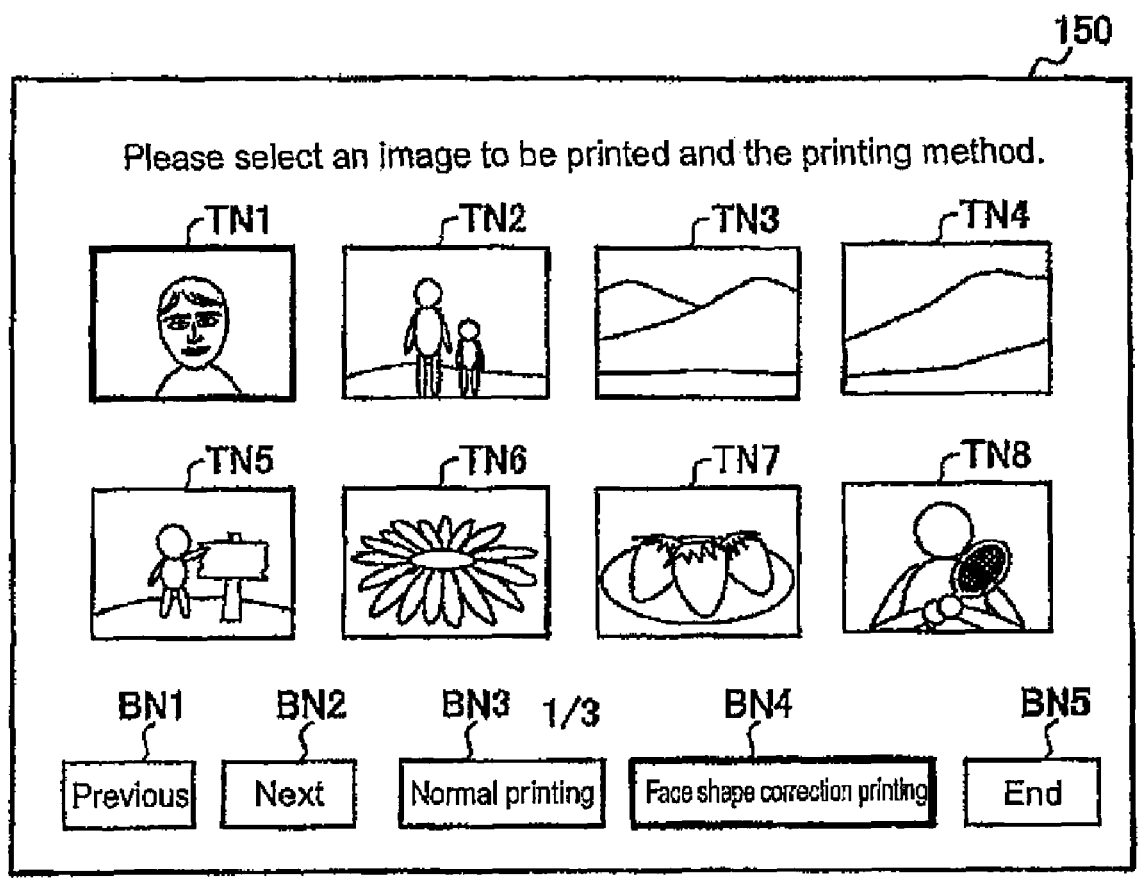
FIG. 6 is an explanatory diagram showing an example of a user interface including thumbnail display of images.

FIG. 6 is an explanatory diagram showing an example of a user interface including thumbnail description of image files. In the user interface shown in FIG. 6, there are displayed eight thumbnail images TN1 through TN8 and five buttons EN1 through EN5. It should be noted that the printer 100 can be arranged to display a list with the thumbnail images with respect to the image files input from the external equipment (the DSC 500) via the I/F section 130 and stored in a predetermined memory area.

When the user selects one (or more) of the images and the normal printing button BN3 in the user interface shown in FIG. 6, the printer 100 executes a normal printing process for printing the selected image as usual. On the other hand, when the user selects one (or more) of the images and the face shape correction printing button BN4 in the user interface, the printer 100 executes a face shape correction printing process for correcting the shape of the face in the selected image and printing the corrected image. In the example shown in FIG. 6, since the thumbnail image TN1 and the face shape correction printing button BN4 are selected, the printer 100 executes the face shape correction printing process on the image corresponding to the thumbnail image TN1.

Figure 7:
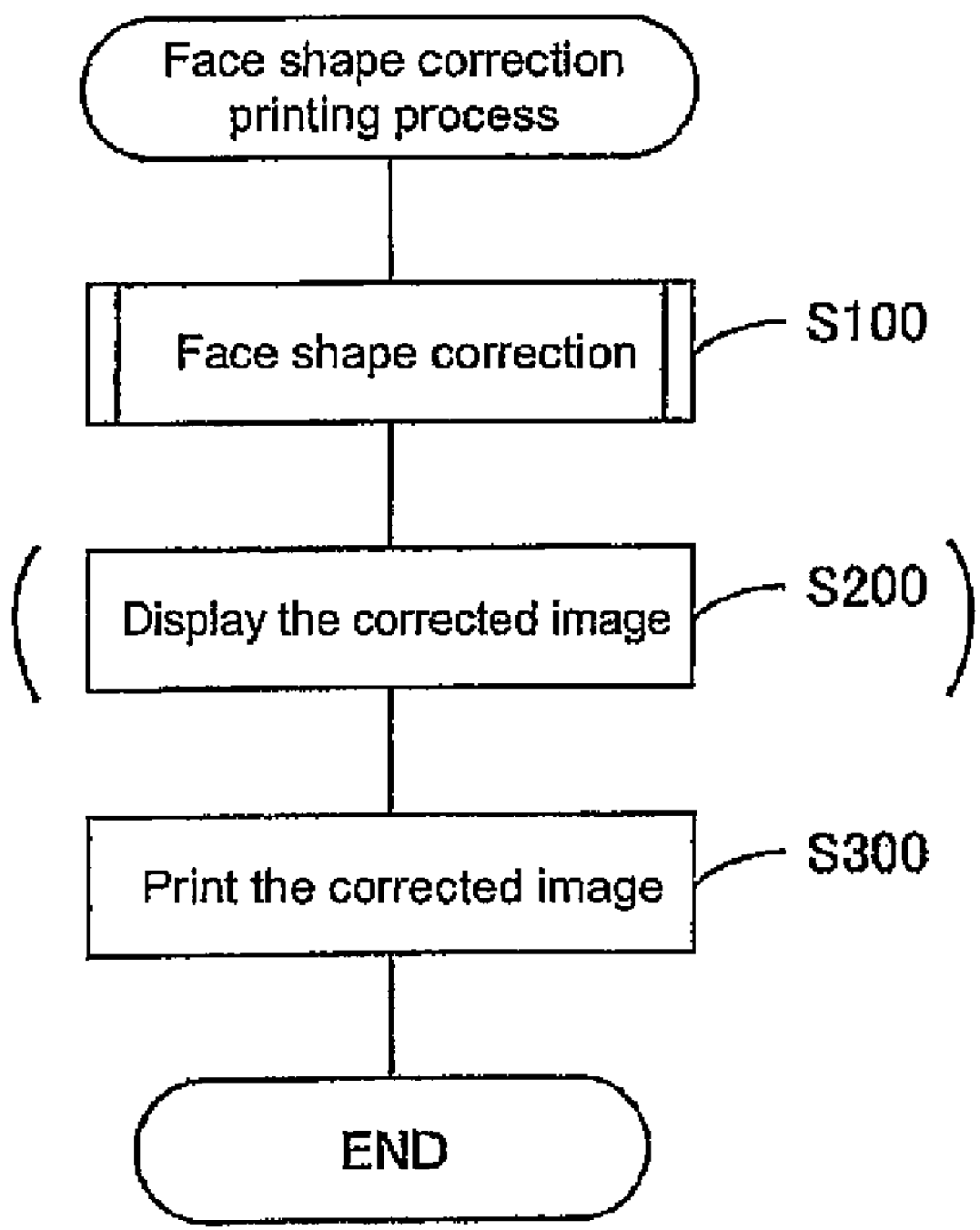
FIG. 7 is an example of a flowchart showing flow of a face shape correction printing process.

FIG. 7 is a flowchart showing flow of the face shape correction printing process executed by the printer 100 of the present embodiment. In the S100, the face shape correction section 200 (FIG. 2) executes a face shape correction process. The face shape correction process in the present embodiment is a process for correcting (transforming) a predetermined area including the face in the image so as to eliminate the difference caused between the impression the observer has when directly observing the face and so on and the impression the observer has when observing the image thereof obtained by imaging.

Figure 8:
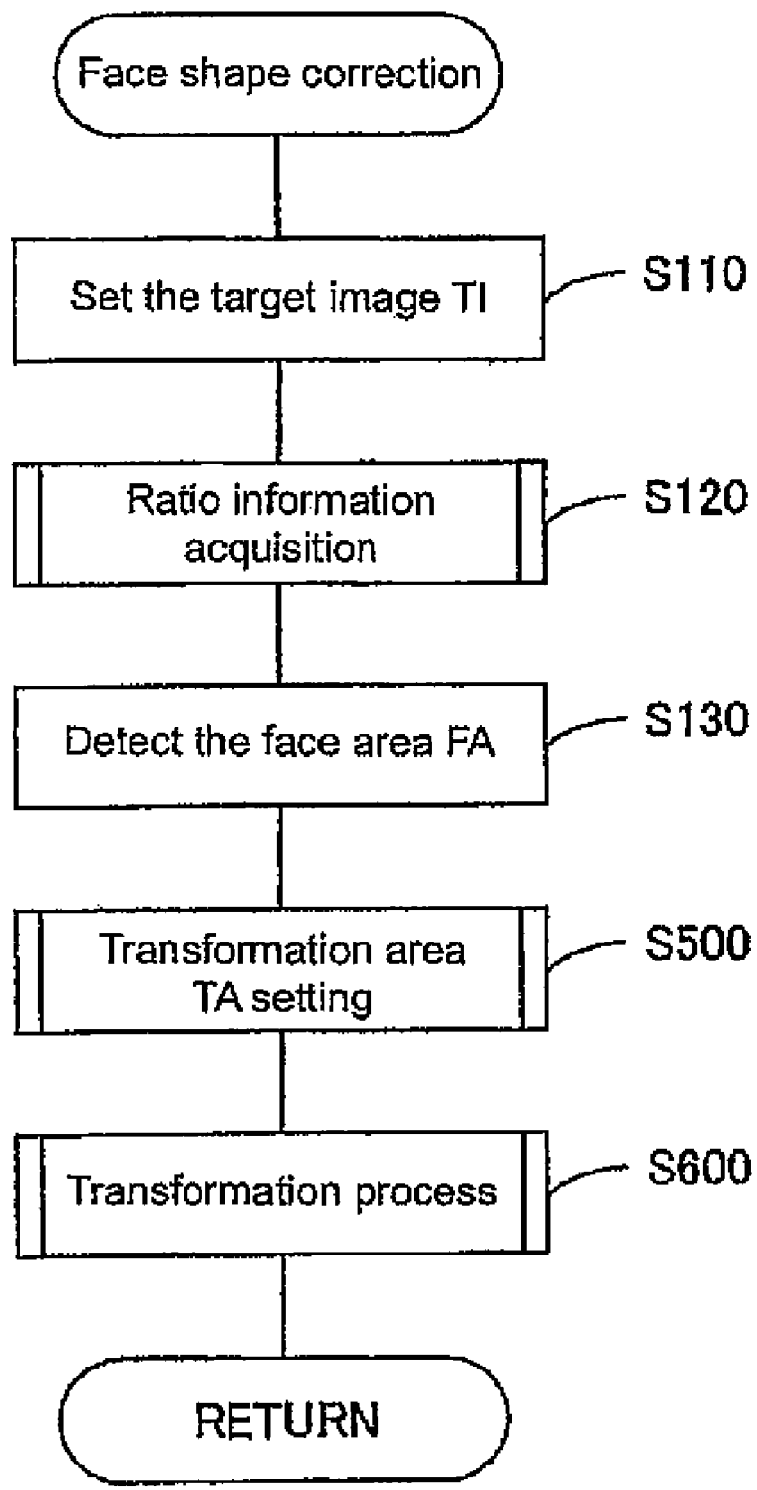
FIG. 8 is an example of a flowchart showing flow of a face shape correction process.

FIG. 8 is a flowchart showing flow of the face shape correction process (S100 in FIG. 7) in the present embodiment. In the S110, the face shape correction section 200 determines the target image TI to be the target of the face shape correction process. The face shape correction section 200 determines the image file corresponding to the thumbnail image TN1 selected by the user in the user interface shown in FIG. 6 as the target image TI. The image file of the target image TI thus determined is input to the printer 100 from the memory card MC via the card I/F 170 and stored in a predetermined area of the internal memory 120. In this context, it can be said that the face shape correction section 200 is also provided with the function as an input section.

In the S120, the ratio information acquisition section 350 calculates the ratio information for defining the degree (the extent) of the transformation used in the image transformation described later based on the additional data included in the image file of the target image TI thus determined in the S110, and then acquires the ratio information.

Figure 9:
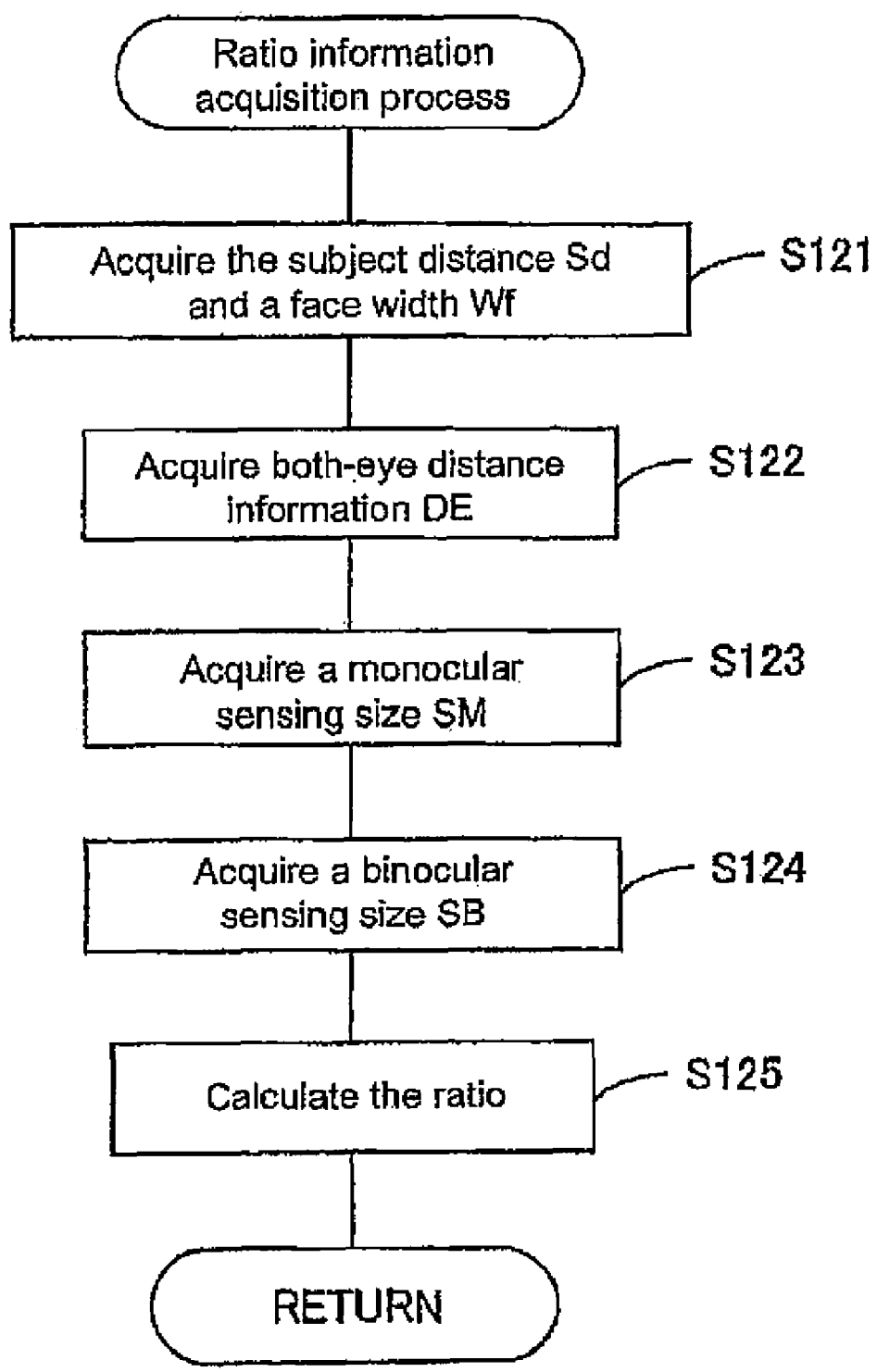
FIG. 9 is an example of a flowchart showing flow of a ratio information acquisition process.

FIG. 9 shows the detailed process in the S120 with a flowchart.

In the S121, the ratio information acquisition section 350 retrieves the data representing the subject distance Sd and the value of the width Wf from the image file of the target image TI and acquires the data.

In the S122, the ratio information acquisition section 350 acquires both-eye distance information DE representing the distance between the right eye and the left eye of a human. The both-eye distance information DE is a value of a distance between the both eyes of a typical figure previously stored in the internal memory 120, and is a numerical value of, for example, 60 mm.

In the S123, the ratio information acquisition section 350 calculates the size (referred to as a monocular sensing size SM) of the subject in the target image TI captured by a single eye (the lens 502) by geometric calculation based on the information (Sd, Wf) acquired in the S121.

Further, in the S124, the ratio information acquisition section 350 calculates the size (referred to as a binocular sensing size SB) of the subject in the target image TI sensed by both eyes of a human by geometric calculation based on the information (Sd, Wf, DE) acquired in the S121 and S122.

Figure 10:
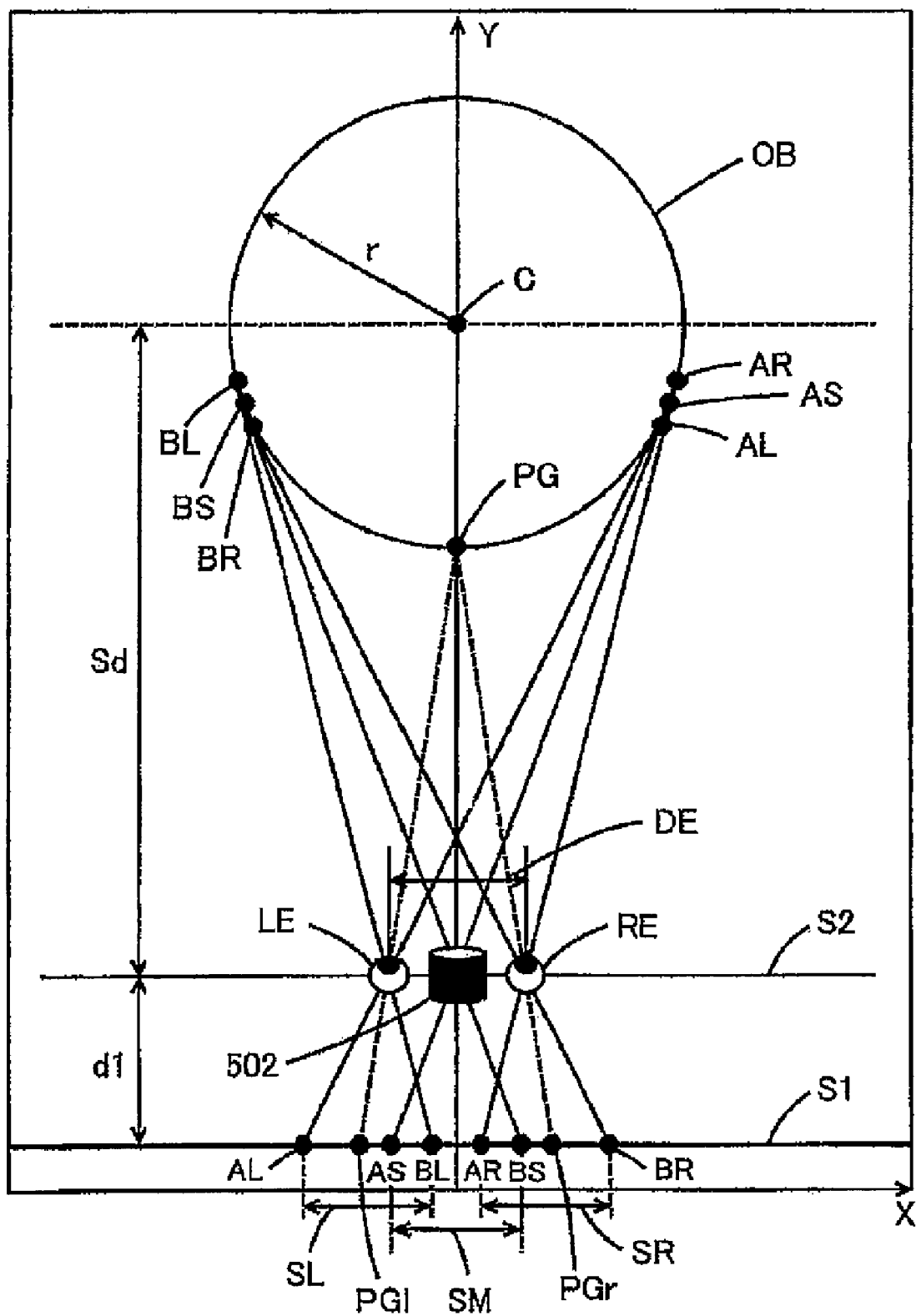
FIG. 10 is an example of an explanation diagram showing how a monocular sensing size SM and a binocular sensing size SB are calculated.
Figure 11:
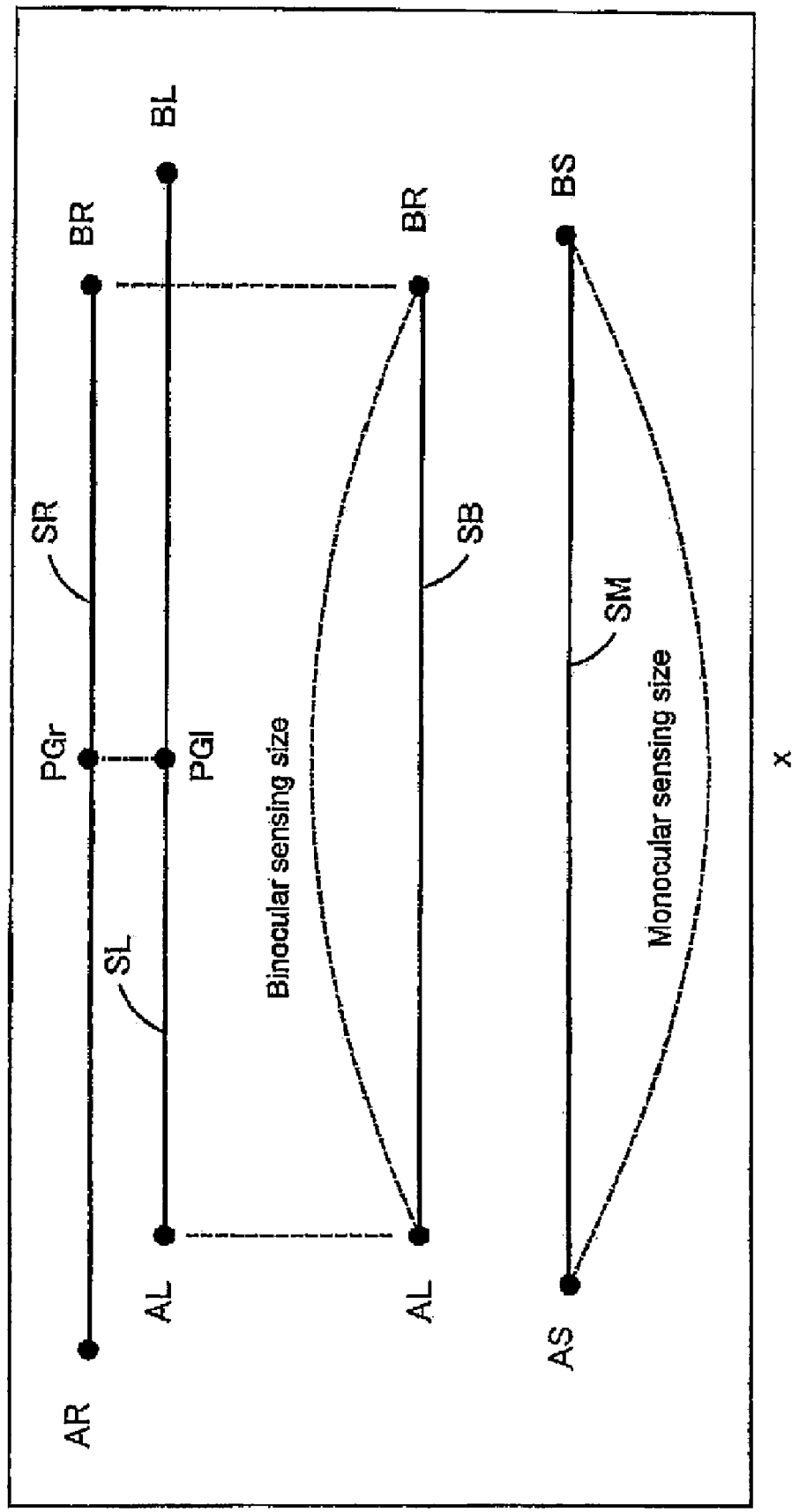
FIG. 11 is an example of an explanation diagram showing the monocular sensing size SM and the binocular sensing size SB.

FIGS. 10 and 11 are explanation diagrams for explaining a method of calculating the monocular sensing size SM and the binocular sensing size SB.

FIG. 10 shows a positional relationship between the lens 502, the both eyes (a right eye RE, a left eye LE) of a human, the subject OB (a face of the figure P), and a virtual imaging surface S1 viewed from the upper surface in a two-dimensional manner. On the Y-axis as the center axis of the drawing, there are positioned the lens 502 (the principal point of the lens 502) and the center point C of the subject OB. The distance between the lens 502 and the center point C is Sd. For the sake of easiness of the calculation, in the present embodiment, the subject OB is assumed to be a spherical member. The radius r of the spherical member OB is Wf/2. The right eye RE and the left eye LE are disposed on both sides of the lens 502 in the condition in which the middle point of the both is identical to the principal point of the lens 502, and the distance therebetween is DE. The line of the right eye RE, the lens 502, and the left eye LE is parallel to the X-axis. The imaging surface S1 is a plane parallel to the X-axis, and disposed across the surface (a observation surface S2), on which the right eye RE, the lens 502, and the left eye LE are arranged, from the subject OB. The distance d1 between the observation surface S2 and the imaging surface S1 is no object. The ratio information acquisition section 350 is only required to set an arbitrary value (distance) as a fixed value to the distance d1 when calculating the monocular sensing size SM and the binocular sensing size SD.

In such a positional relationship, in the S123, the ratio information acquisition section 350 draws two tangential lines of the subject OB intersecting each other at the position of the lens 502. The range between the two tangent points AS, BS at which the two tangential lines and the subject OB have contact with each other becomes the lateral width of the subject OB captured via the lens 502. Therefore, the ratio information acquisition section 350 calculates the distance in the X-axis direction between the two intersections between the two tangential lines and the imaging surface S1 as the monocular sensing size SM.

In the S124 described above, the ratio information acquisition section 350 firstly draws two tangential lines of the subject OB intersecting with each other at the position of the right eye RE and two tangential lines of the subject OB intersecting with each other at the position of the left eye LE as a process in the preliminary stage for obtaining the binocular sensing size SB. The range between the two tangent points AR, BR, at which the two tangential lines intersecting with each other at the right eye position and the subject OB have contact with each other, becomes the lateral width of the subject OB sensed by the right eye. Therefore, the ratio information acquisition section 350 calculates the distance in the X-axis direction between the two intersections between the two tangential lines intersecting with each other at the position of the right eye RE and the imaging surface S1 as a right eye sensing range SR. Similarly, the range between the two tangent points AL, BL, at which the two tangential lines intersecting with each other at the left eye position and the subject OB have contact with each other, becomes the lateral width of the subject OB sensed by the left eye. Therefore, the ratio information acquisition section 350 calculates the distance in the X-axis direction between the two intersections between the two tangential lines intersecting with each other at the position of the left eye LE and the imaging surface S1 as a left eye sensing range SL.

As described above, the ranges of the subject sensed by the right eye RE and the left eye LE respectively are shifted from each other in the horizontal direction (the lateral width direction). Here, it is assumed that when a human views a matter, the human overlaps the image in the range sensed by the right eye RE and the image in the range sensed by the left eye LE, and recognizes the range common to the both ranges as the size of the matter. Therefore, in the present embodiment, the length of the range common to the left eye sensing range SL and the right eye sensing range SR calculated above when overlapping the both ranges is used as the binocular sensing size SB. In the overlapping process, the position of the point of regard PG on the subject OB is used. The point of regard PG is the point assumed to draw most attention when a human views the subject OB, and in the present embodiment, it is assumed to be the point on the subject OB, visible from both of the right eye RE and the left eye LE, and have the same distances from the right eye RE and the left eye LE. The ratio information acquisition section 350 defines the intersection point between the straight line passing through the point of regard PG and the right eye RE and the imaging surface S1 as a point PGr on the right eye sensing range SR corresponding to the point of regard PG, and the intersection point between the straight line passing through the point of regard PG and the left eye LE and the imaging surface S1 as a point PG1 on the left eye sensing range SL corresponding to the point of regard PG. Further, the ratio information acquisition section 350 overlaps the left eye sensing range SL and the right eye sensing range SR so that the point PGr and the point PG1 are identical to each other.

FIG. 11 shows the condition in which the left eye sensing range SL and the right eye sensing range SR are overlapped with each other so that the point PGr and the point PG1 match each other, and the ratio information acquisition section 330 recognizes the length in the X-axis direction of the range common to the both ranges SL, SR as the binocular sensing size SB. The binocular sensing size SB thus obtained becomes smaller than the monocular sensing size SM obtained in the S123 described above. Therefore, when observing the image of the subject OB imaged via the lens 502 of the DSC 500, it can be said that the impression that the lateral width is larger (thicker) compared to the case of directly observing the subject OB is received.

Subsequently, in the S125, the ratio information acquisition 350 calculates the ratio between the monocular sensing size SM and the binocular sensing size SB thus calculated above. For example, the ratio of the binocular sensing size SB is calculated assuming that the monocular sensing size SM is 1, and the numerical value of the ratio is used as the ratio information.

As described above, in the present embodiment, the length of the common range obtained by overlapping the right eye sensing range SR and the left eye sensing range SL with each other using the point of regard PG of the subject OB as a reference is used as the binocular sensing size SB. Therefore, it is assumed that the ratio in length between the binocular sensing size SB and the monocular sensing size SM accurately represents the difference between the impression of the width of the subject OB in the lateral direction a human receives when observing the subject OD with the subject distance of Sd and the impression of the width of the subject OS in the lateral direction the human receives when observing the image of the subject OD imaged with the monocular lens with the same subject distance Sd.

Subsequently, in the S130 (FIG. 8), the face area detection section 220 (FIG. 2) executes detection of the face area FA in the target image TI. Similarly to the face area detection section 620 of the DSC 500, the face area detection section 220 is capable of detecting the face area FA using the face detection method known to the public such as a method by pattern matching using a template. It should be noted that in the present embodiment, as described above, the image file of the target image TI includes the information (the coordinates of the four apexes of the face area FA) capable of specifying the position of the face area FA detected by the face area detection section 620 of the DSC 500 as the additional data. Therefore, in the S130, the face area detection section 220 retrieves the information capable of specifying the position of the face area FA from the image file of the target image TI, and at the same time, sets the face area FA with a rectangular shape on the target image TI based on the information thus retrieved.

In the S500, the printer 100 sets the transformation area TA based on the face area FA on the target image TI. The transformation area TA is an area on the target image TI, and to be a target of the image transformation process for the face shape correction.

Figure 14:
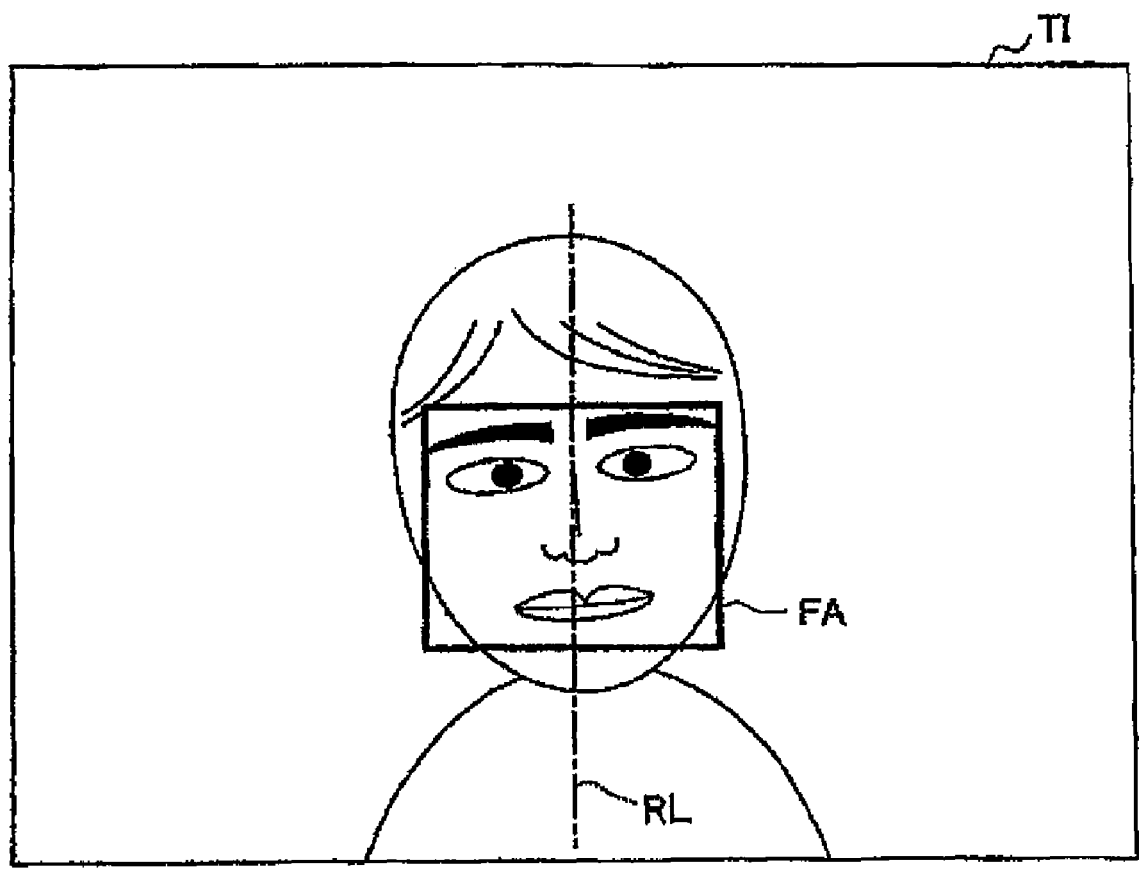
FIG. 14 is an explanatory diagram showing an example of a result of detection of a face area FA.

FIG. 14 is an explanatory diagram showing an example of a result of the detection of the face area FA. A reference line RL shown in FIG. 14 is a line for defining the height direction (the vertical direction) of the face area FA, and representing the center of the face area PA in the width direction (the horizontal direction). Specifically, the reference line RL is a line passing through the center of gravity of the rectangular face area FA, and parallel to the boundary along the height direction (the vertical direction) of the face area FA.

The transformation area TA is set based on the face area FA. Here, as described above, the face detection method (e.g., the method by the pattern matching using the template) known to the public used for detecting the face area FA is not for detecting the position and the tilt (angle) of the entire face or regions (e.g., an eye, a mouth) of the face in detail, but for setting the area thought to roughly include the image of a face in the target image TI as the face area FA. On the other hand, since an image of a face generally attracts a lot of attention, there is a possibility that the image corrected in the face shape becomes unnatural depending on the relationship of the position and the angle between the transformation area TA set based on the face area FA and the image of the face. Therefore, in the present embodiment, it is arranged to execute position adjustment and tilt adjustment described below on the face area FA detected in the S130 in order for realizing a more natural and preferable face shape correction.

Figure 15:
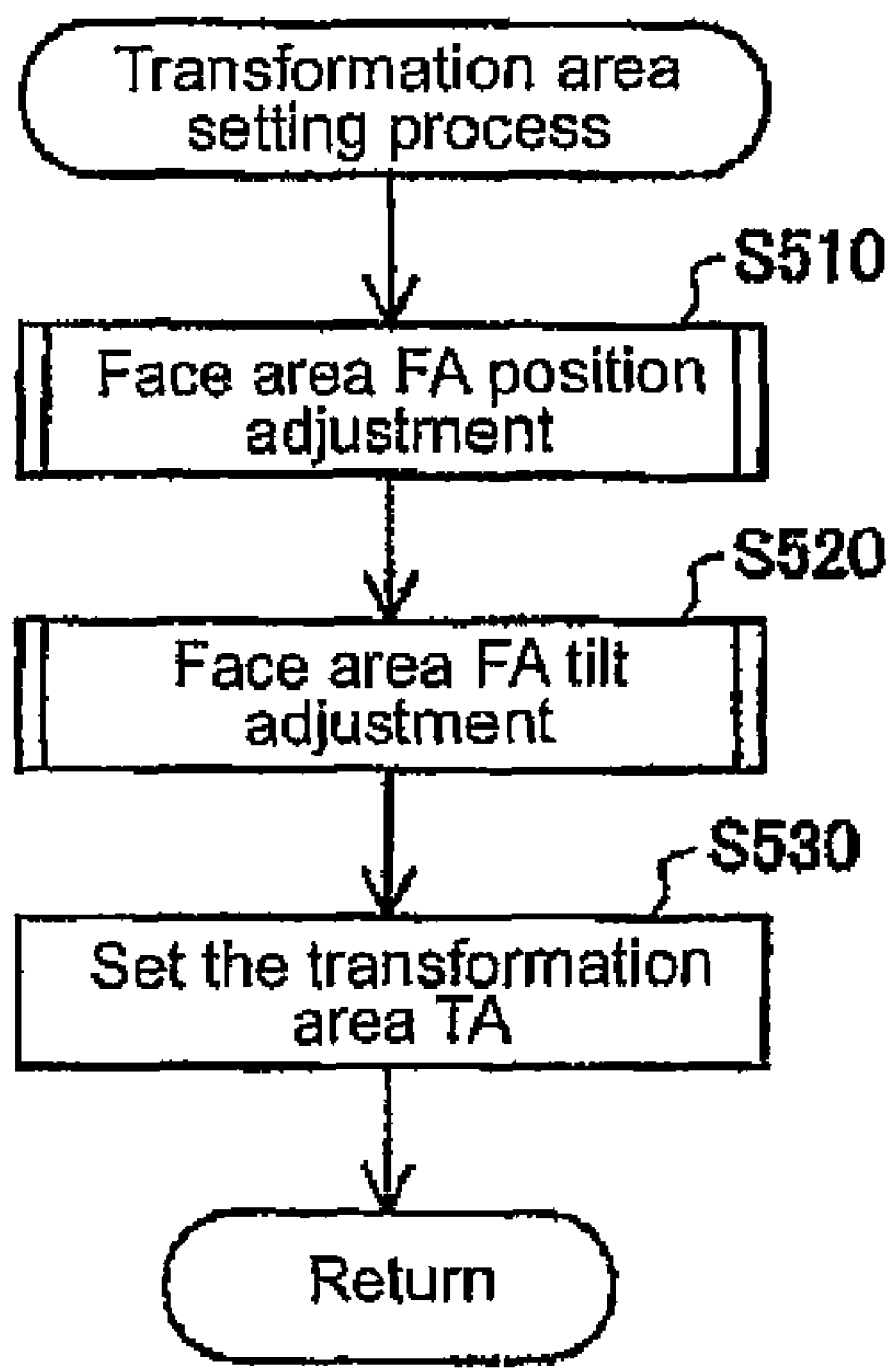
FIG. 15 is an example of a flowchart showing flow of a transformation area setting process.

FIG. 15 is a flowchart showing flow of a transformation area setting process. In the S510, the face area adjustment section 230 (FIG. 2) executes adjustment of the position in the height direction of the face area FA detected in the S130. Here, the adjustment of the position in the height direction of the face area PA denotes that the position of the face area FA along the reference line RL (see FIG. 14) is adjusted to reconfigure the face area FA in the target image TI.

Figure 16:
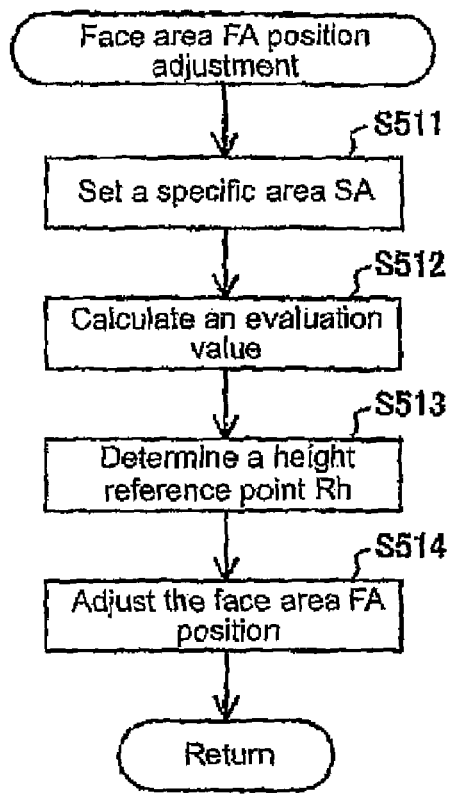
FIG. 16 is an example of a flowchart showing flow of a process of adjusting a position of the face area FA in the height direction.

FIG. 16 is a flowchart showing flow of the process of adjusting the position of the face area FA in the height direction. In the S511, the face area adjustment section 230 sets a specific area SA. Here, the specific area SA denotes an area on the target image TI, and including an image of a predetermined reference subject to be referred to when the position adjustment of the face area FA in the height direction is executed. The reference subject can be set, for example, to "an eye," and on this occasion, the specific area SA is set as an area including the image of "the eye."

Figure 17:
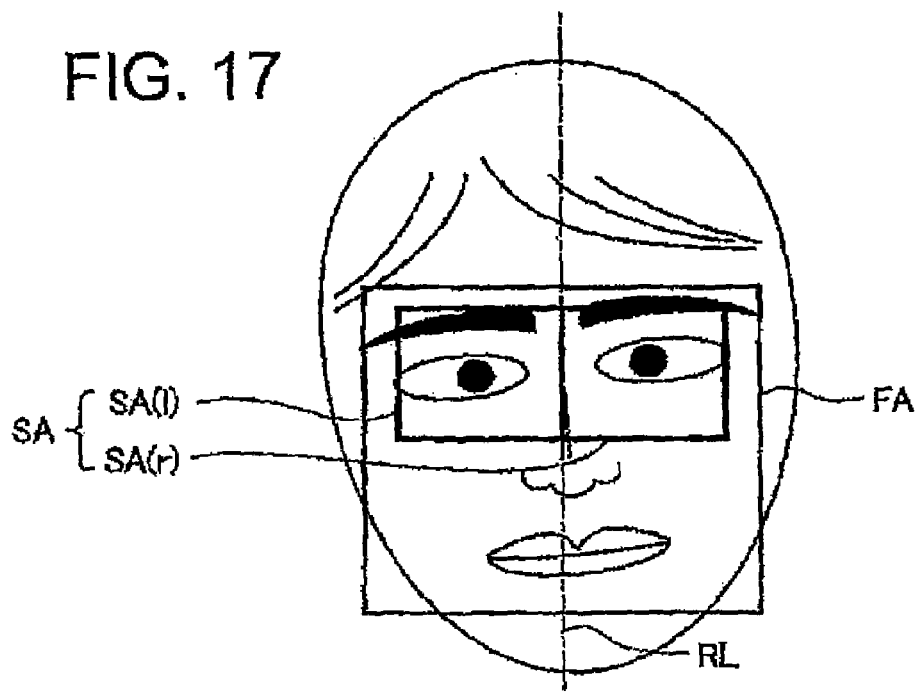
FIG. 17 is an explanatory diagram showing an example of a specific area SA.

FIG. 17 is an explanatory diagram showing an example of a specific area SA. In the present embodiment, the face area adjustment section 230 sets the specific area SA based on the relationship with the face area FA. Specifically, an area having a size obtained by shrinking (or expanding) the size of the face area FA at a predetermined ratio in both directions perpendicular and parallel to the reference line RL, and having a predetermined positional relationship with the position of the face area FA is set as the specific area SA. In other words, in the present embodiment, the predetermined ratio and the predetermined positional relationship described above are set previously so that the specific area SA becomes an area including the image of the both eyes by setting the specific area SA based on the relationship with the face area FA. It should be noted that the specific area SA is preferably set to be an area as small as possible providing that the image of the both eyes is included so as to minimize the chance to include an image (e.g., an image of a hair) difficult to distinguish from the image of the eye.

Further, as shown in FIG. 17, the specific area SA is set as an area with a rectangular shape symmetrical with respect to the reference line RL. The specific area SA is divided by the reference line RL into two areas, namely an area on the left (hereinafter also referred to as "a left divisional specific area SA(l)") and an area on the right (hereinafter also referred to as "a right divisional specific area SA(r)"). The specific area SA is set so that the image of an eye is included in each of the left divisional specific area SA(l) and the right divisional specific area SA(r).

Figure 18:
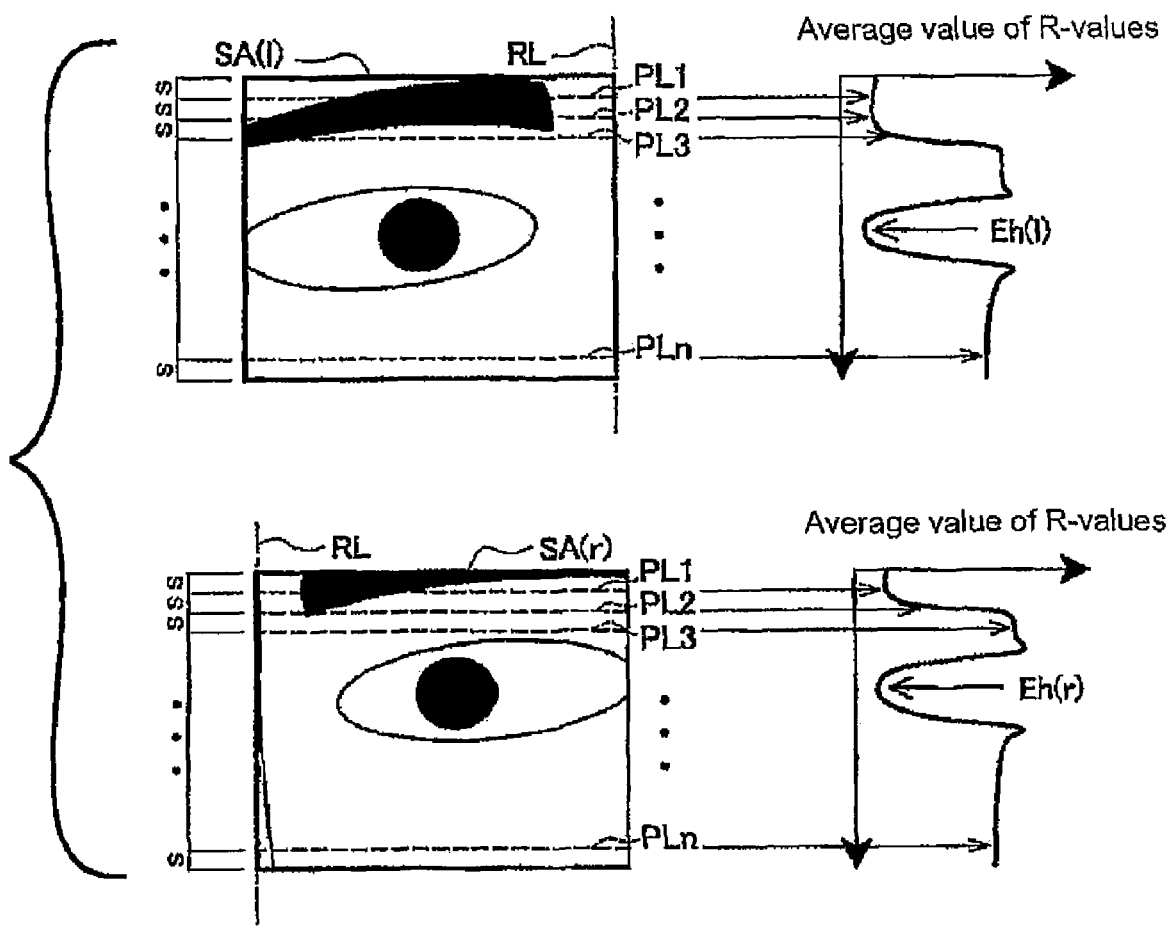
FIG. 18 is an explanatory diagram showing an example of a method of calculating evaluation values.

In the S512 (FIG. 16), the face area adjustment section 230 calculates evaluation values for detecting the position of the image of the eyes in the specific area SA. FIG. 18 is an explanatory diagram showing an example of a method of calculating evaluation values. In the present embodiment, R-values (R-component values) of the respective pixels of the target image TI as RGB image data are used for calculating the evaluation values. This is because it is conceivable that since the image of a skin and the image of the eye are significantly different in the R-value from each other, the detection accuracy of the image of the eye can be enhanced by using the R-values for calculating the evaluation values. Further, it is another reason therefor that in the present embodiment, since the data of the target image TI is acquired as the RGB data, efficiency of calculation of the evaluation values can be promoted by using the R-values for calculating the evaluation values. It should be noted that as shown in FIG. 18, the calculation of the evaluation values is executed individually on each of the two divisional specific areas (i.e., the left divisional specific area SA(l) and the right divisional specific area SA(r)).

As shown in FIG. 18, the face area adjustment section 230 sets n lines (hereinafter referred to as "target pixel specifying lines PL1 through PLn") in the divisional specific areas (i.e., the left divisional specific area SA(l) and the right divisional specific area SA(r)). The target pixel specifying lines PL1 through PLn are lines for equally dividing the height (the size thereof along the reference line RL) of each the divisional specific areas into n+1. In other words, the intervals between the target pixel specifying lines PL are all the same intervals of s.

Figure 19A:
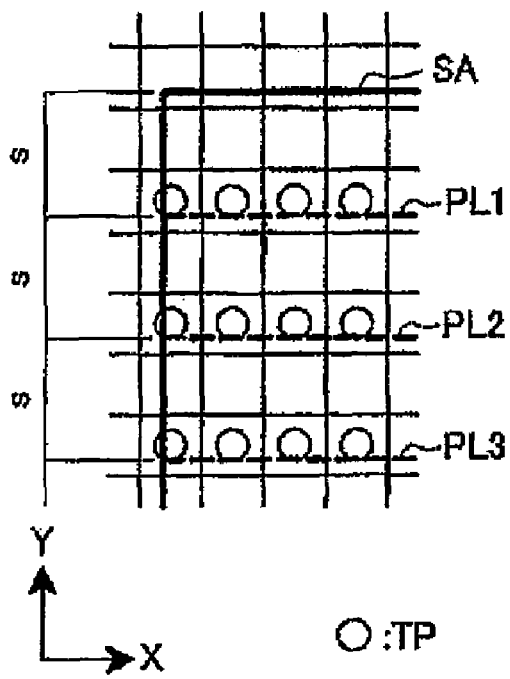
FIGS. 19A and 19B are explanatory diagrams showing an example of a method of selecting evaluation target pixels TP.
Figure 19B:
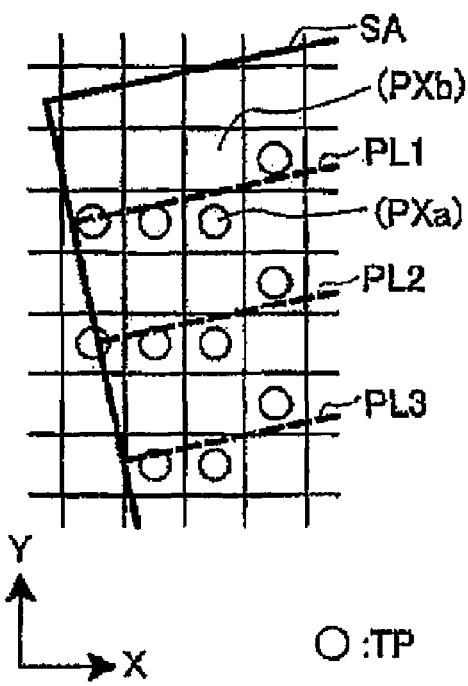

The face area adjustment section 230 selects the pixels (hereinafter referred to as "evaluation target pixels TP") used for calculating the evaluation values in the pixels forming the target image TI for each of the target pixel specifying lines PL1 through PLn. FIGS. 19A and 19B are explanatory diagrams showing an example of a method of selecting the evaluation target pixels TP. The face area adjustment section 230 selects the pixels overlapping the target pixel specifying lines PL as the evaluation target pixels TP from the pixels forming the target image TI. FIG. 19A shows the case in which the target pixel specifying lines PL are parallel to the row direction (the X direction in FIGS. 19A and 19B) of the pixels of the target image TI. In this case, the pixels (the encircled pixels in FIG. 19A) on the pixel rows overlapping the respective target pixel specifying lines PL are selected as the evaluation target pixels TP of the respective target pixel specifying lines.

On the other hand, depending on the method of detecting the face area FA and the method of setting the specific area SA, there is also caused the case in which the target pixel specifying lines PL are not parallel to the row direction (the X direction) of the pixels of the target image TI as shown in FIG. 19B. Also in such a case, the pixels overlapping the respective target pixel specifying lines PL are selected as the evaluation target pixels TP for the respective target pixel specifying lines PL, as a general rule. It should be noted that in the case in which a certain target pixel specifying line PL overlaps two pixels positioned in the same column (i.e., with the same Y coordinates) of the pixel matrix of the target image TI as in the relationship between the target pixel specifying line PL1 and the pixels PXa and PXb shown in FIG. 19B, the pixel (e.g., the pixel PXb) with a smaller length of the overlapping part is removed from the evaluation target pixels TP. Thus, only one pixel is selected as the evaluation target pixel TP from one column of the pixel matrix with respect to each of the target pixel specifying lines PL.

It should be noted that in the case in which the tilt of the target pixel specifying line PL with respect to the X direction exceeds 45 degrees, the relationship between the rows and the columns of the pixel matrix is reversed in the above explanation, only one pixel is selected as the evaluation target pixel TP from one row of the pixel matrix. Further, depending on the relationship of the size between the target image TI and the specific area SA, there is the case in which one pixel is selected as the evaluation target pixel TP for a plurality of target pixel specifying lines.

The face area adjustment section 230 calculates the average value of the R-values of the evaluation target pixels TP as the evaluation value for each of the target pixel specifying lines PL. It should be noted that in the present embodiment, it is arranged to eliminate the pixels with large R-values from the calculation target in the plurality of evaluation target pixels TP thus selected for each of the target pixel specifying lines PL. Specifically, in the case in which k evaluation target pixels TP are selected with respect to a certain target pixel specifying line PL, the evaluation target pixels TP are separated into two groups, a first group composed of 0.75 k pixels with relatively large R-values and a second group composed of 0.25 k pixels with relatively small R-values, and only the pixels belonging to the second group become the target of calculating the average value of the R-values as the evaluation value. The reason that some of the evaluation target pixels TP are eliminated from the calculation target of the evaluation value will be described later.

As described above, in the present embodiment, the face area adjustment section 230 calculates the evaluation values for the respective target pixel specifying lines PL. Here, since the target pixel specifying lines PL are the lines perpendicular to the reference line RL, it is possible to express that the evaluation values are calculated with respect to a plurality of positions (evaluation positions) along the reference line RL. Further, the evaluation values can be expressed as the values for representing a characteristic of the distribution of the pixel values along the direction perpendicular to the reference line RL with respect to each of the evaluation positions.

In the S513 (FIG. 16), the face area adjustment section 230 detects the positions of the eyes in the specific area SA, and determines a height reference point Rh based on the detection result. Firstly, as shown in the right part of FIG. 18, the face area adjustment section 230 creates a curve representing the distribution of the evaluation values (the average values of the R-values) along the reference line RL with respect to each of the divisional specific areas, and detects the position along the direction of the reference line RL where the evaluation value has a local minimal value as the eye position Eh. It should be noted that the eye position Eh in the left divisional specific area SA(l) is described as Eh(l), and the eye position Eh in the right divisional specific area SA(r) is described as Eh(r).

In the case with the yellow race, it is assumed that a part of the divisional specific area representing an image of the skin has a large R-value, and a part representing an image of the eye (more specifically, the black eye at the center of the eye) has a small R-value. Therefore, as described above, it becomes possible to judge that the position along the reference line RL where the evaluation value (the average value of the R-values) has a local minimal value is the eye position Eh. It should be noted that in the case in which other races the white race and the black race) are targeted, another evaluation value (e.g., luminance or a B-value) is used.

It should be noted that there are some cases in which the divisional specific area includes an image (e.g., an image of an eyebrow or an image of hairs) with a small R-value besides the image of the eye as shown in FIG. 18. Therefore, in the case in which the curve representing the distribution of the evaluation values along the reference line RL has a plurality of local minimal values, the face area adjustment section 230 judges that the lowest position of the positions with the local minimal values is the eye position Eh. Since it is generally conceivable that the image with a small R-value such as an eyebrow or hairs is often positioned above the image of the eye, and further, there are few cases in which an image with a small R-value is positioned under the image of the eye, such a judgment becomes possible.

Further, since there is a possibility that the curve takes a local minimal value, although the evaluation value is large, even under the position of the eye image (at the position corresponding mainly to the image of the skin), it is possible to disregard those larger than a predetermined threshold value out of the local minimal values. Alternatively, it is also possible to simply take the position of the target pixel specifying line PL corresponding to the minimum value of the evaluation values calculated for the respective target pixel specifying lines PL as the eye position Eh.

It should be noted that in the present embodiment, the eye (the black eye portion at the center of the eye), which is a region conceivably having a relatively large color difference from the surrounding area in the face, is used as the reference subject for adjusting the position of the face area FA. However, since the average value of the R-values as the evaluation value is calculated for a plurality of evaluation target pixels TP on the target pixel specifying line PL, there is a possibility that the image of the white portion surrounding the black eye influences the accuracy in detecting the black eye portion to drop. In the present embodiment, as described above, some of the evaluation target pixels TP conceivably having large color differences from the reference subject (e.g., the pixels with relatively large R-values belonging to the first group described above) are eliminated from the calculation target of the evaluation values, thereby further enhancing the accuracy in detecting the reference subject.

Figure 20:
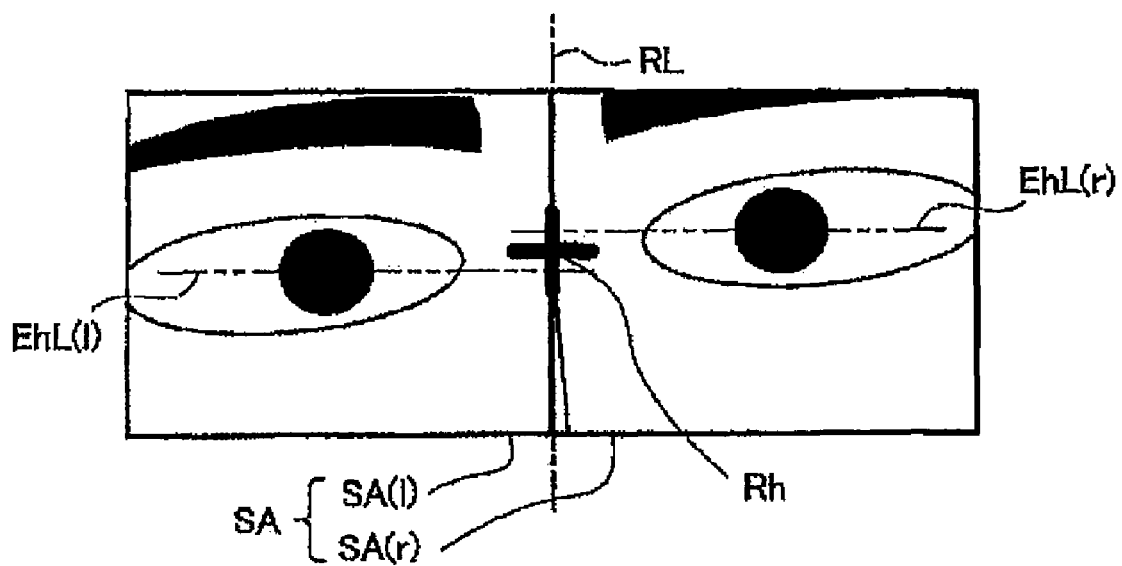
FIG. 20 is an explanatory diagram showing an example of a method of determining a height reference point Rh.

Subsequently, the face area adjustment section 230 determines the height reference point Rh based on the eye position Eh thus detected. FIG. 20 is an explanatory diagram showing an example of a method of determining the height reference point Rh. The height reference point Rh is a point used as a reference in adjusting the position of the face area FA in the height direction. In the present embodiment, as shown in FIG. 20, a point on the reference line RL located between the positions Eh(l) and Eh(r) of the two, namely right and left eyes is set as the height reference point Rh. Specifically, the middle point between the intersection of a straight line EhL(l) representing the left eye position Eh(l) and the reference line RL and the intersection of a straight line EhL(r) representing the right eye position Eh(r) and the reference line RL is set as the height reference point Rh.

Figure 21:
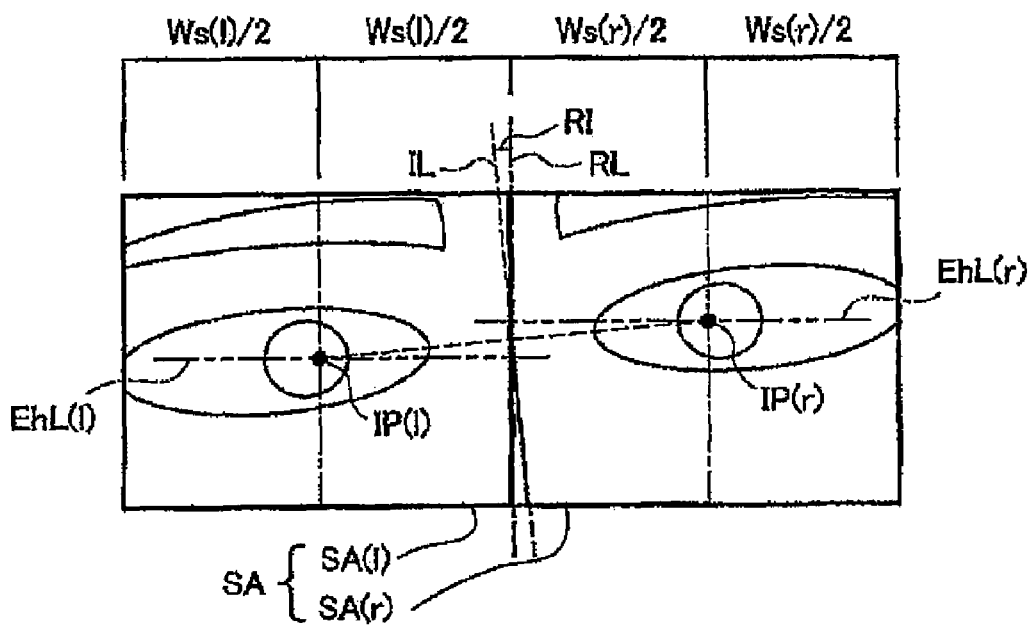
FIG. 21 is an explanatory diagram showing an example of a method of calculating a rough tilt angle RI.

It should be noted that in the present embodiment, it is arranged that the face area adjustment section 230 calculates a rough tilt angle (hereinafter referred to as "a rough tilt angle RI") of the face image based on the eye position Eh thus detected. The rough tilt angle RI of the face image is an angle representing the estimation on an approximate tilt amount of the face image in the target image TI with respect to the reference line RL of the face area FA. FIG. 21 is an explanatory diagram showing an example of a method of calculating the rough tilt angle RI. As shown in FIG. 21, the face area adjustment section 230 firstly determines an intersection IP(l) of a straight line dividing the width Ws(l) of the left divisional specific area SA(l) into two equal parts and the straight line EhL(l), and an intersection IP(r) of a straight line dividing the width Ws(r) of the right divisional specific area SA(r) into two equal parts and the straight line EhL(r). Further, the angle formed between a straight line IL perpendicular to a straight line connecting the intersections IP(l) and IP(r) and the reference line RL is calculated as the rough tilt angle RI.

Figure 22:
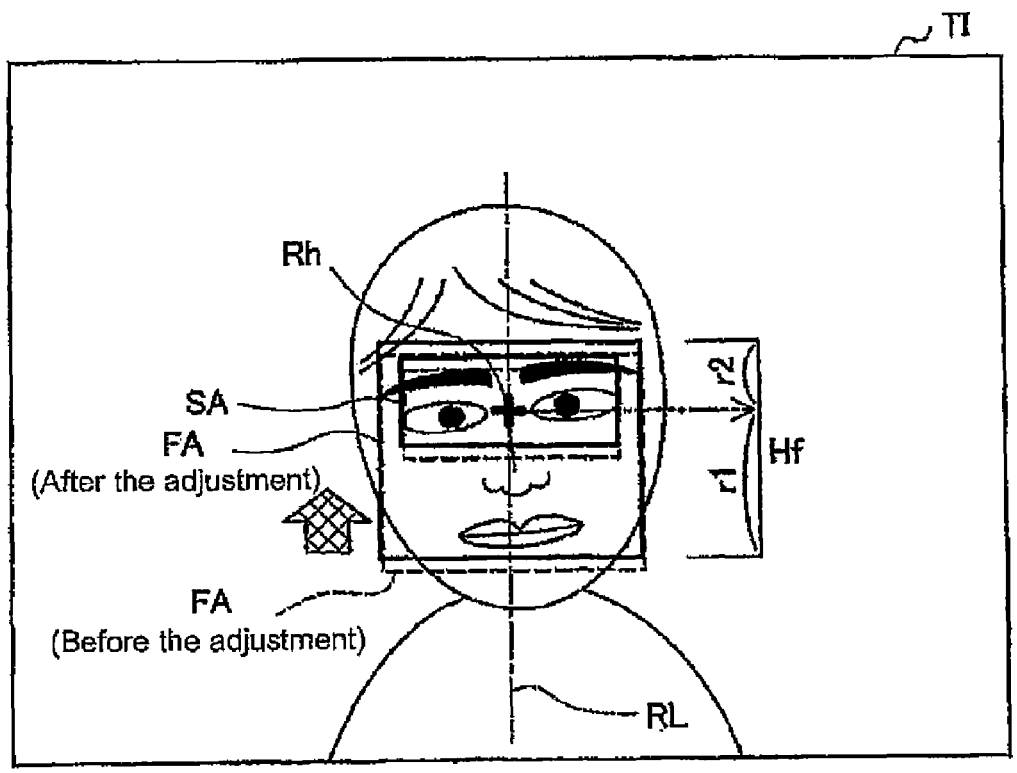
FIG. 22 is an explanatory diagram showing an example of a method of adjusting the position of the face area FA in the height direction.

In the S514 (FIG. 16), the face area adjustment section 230 adjusts the position of the face area FA in the height direction. FIG. 22 is an explanatory diagram showing an example of a method of adjusting the position of the face area FA in the height direction. The adjustment of the position of the face area FA in the height direction is preformed by reconfiguring the face area FA so that the height reference point Rh is located at a predetermined position in the face area FA on which the position adjustment has been executed. Specifically, as shown in FIG. 22, the position of the face area FA is adjusted in the vertical direction along the reference line RL so that the height reference point Rh is located at the position of dividing the height Hf of the face area FA at a predetermined ratio of r1 to r2. In the example shown in FIG. 22, by moving the unadjusted face area FA illustrated with the broken lines upward, the adjusted face area FA illustrated with the solid lines is reconfigured.

After the position adjustment of the face area FA, in the S520 (FIG. 15), the face area adjustment section 230 executes the tilt adjustment (angle adjustment) of the face area FA. Here, the tilt adjustment of the face area FA denotes that the tilt of the face area FA in the target image TI is adjusted so as to fit the tilt of the face image to reconfigure the face area FA. In the present embodiment, the predetermined reference subject to be referred to in executing the tilt adjustment of the face area FA is set to "both eyes." In the tilt adjustment of the face area FA according to the present embodiment, a plurality of evaluation directions representing alternatives of the adjustment angles for the tilt adjustment is set, and evaluation specific areas ESA corresponding respectively to the evaluation directions are set as the areas including the image of the both eyes. Further, the evaluation values are calculated based on the pixel values of the image in the evaluation specific areas ESA for the respective evaluation directions, and the tilt of the face area FA is adjusted using the adjustment angle for tilt adjustment thus determined based on the evaluation values.

Figure 23:
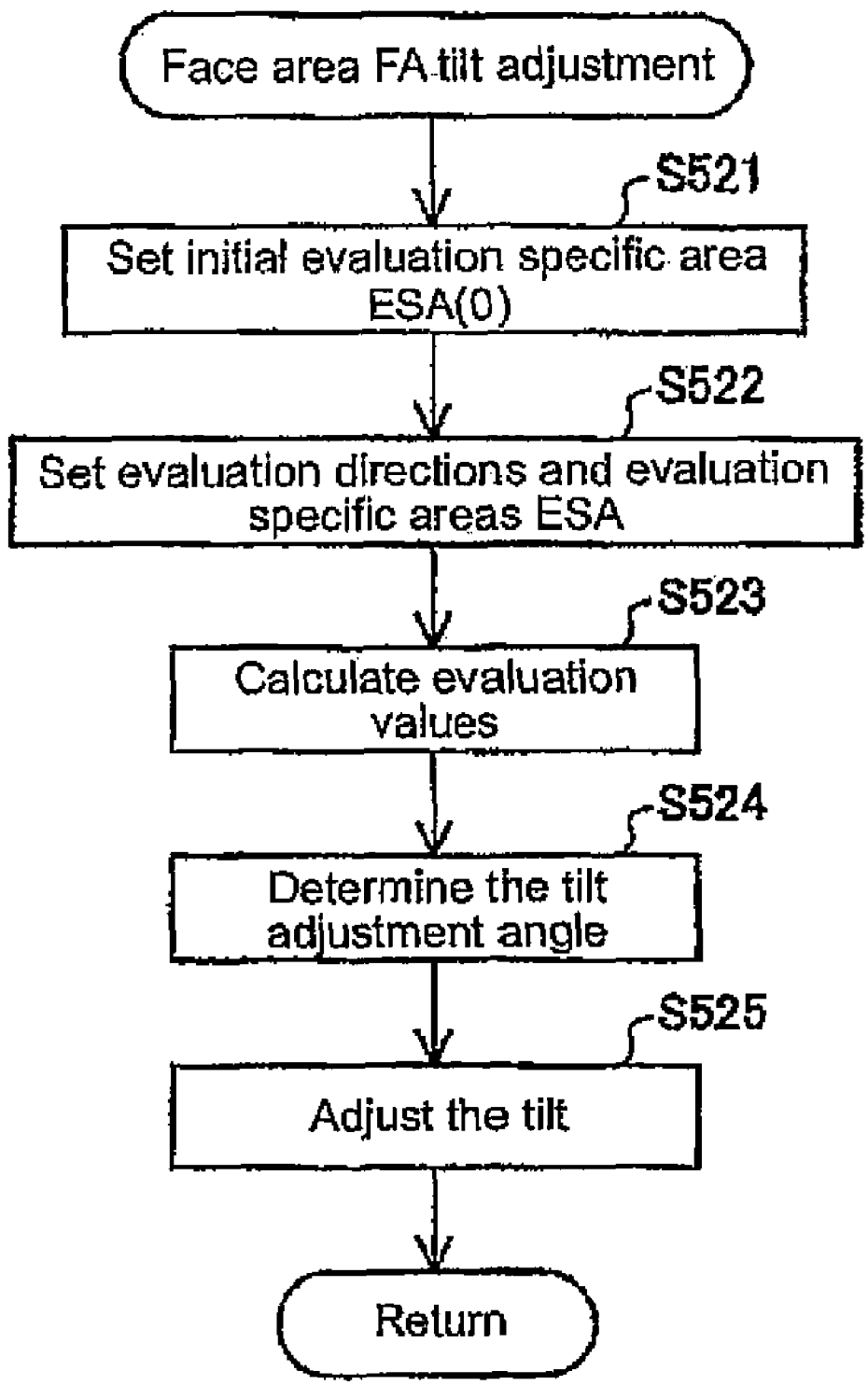
FIG. 23 is an example of a flowchart showing flow of a process of adjusting the tilt of the face area FA.
Figure 24:
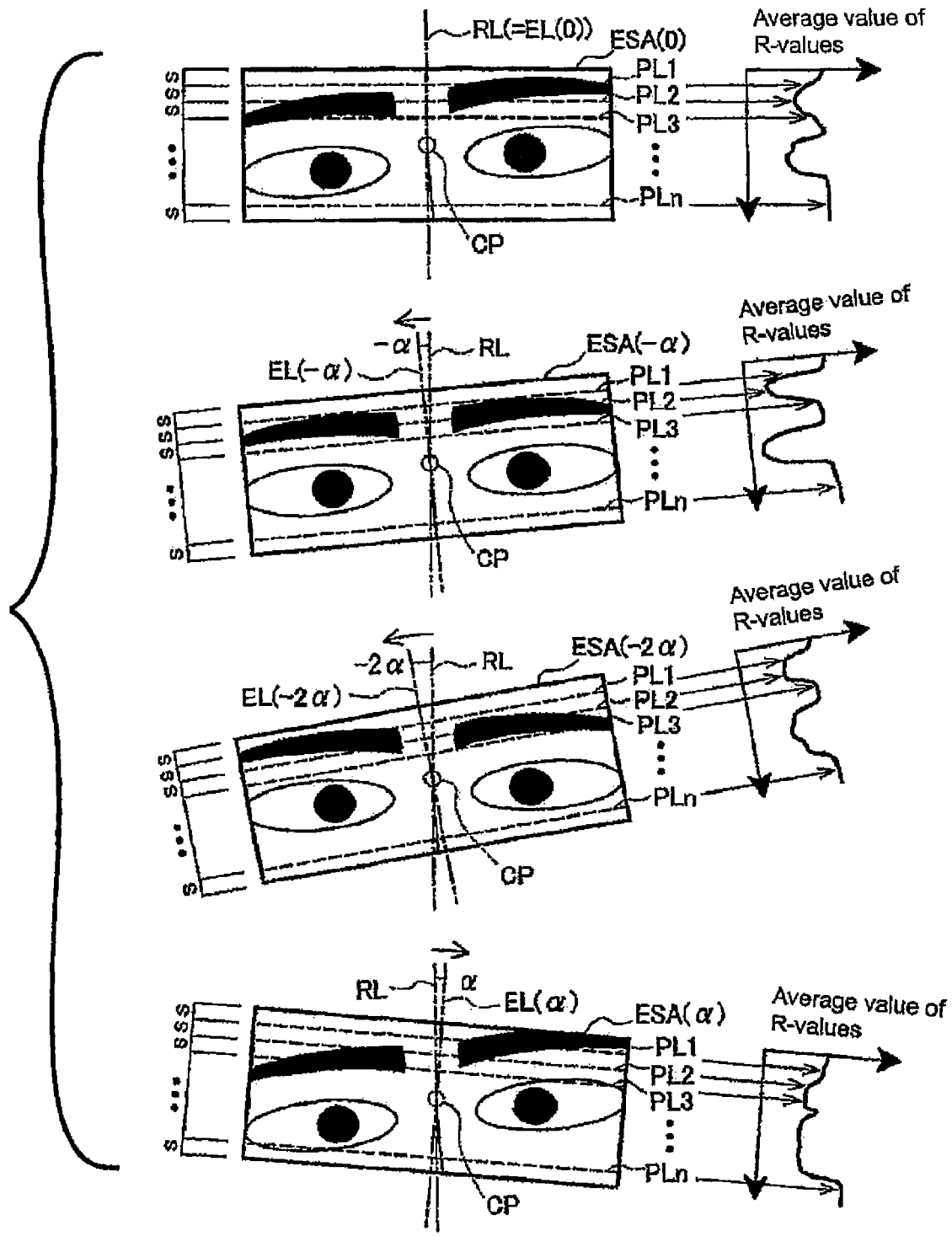
FIG. 24 is an explanatory diagram showing an example of a method of calculating evaluation values for adjusting the tilt of the face area FA.

FIG. 23 is a flowchart showing flow of a process of adjusting the tilt of the face area PA in the present embodiment. Further, FIG. 24 is an explanatory diagram showing an example of a method of calculating evaluation values for adjusting the tilt of the face area FA. In the S521 (FIG. 23), the face area adjustment section 230 sets an initial evaluation specific area ESA(0). The initial evaluation specific area ESA(0) is one of the evaluation specific areas ESA corresponding to a direction (hereinafter also referred to as "an initial evaluation direction") parallel to the reference line RL (see FIG. 22) in the face area FA on which the position adjustment has been executed. In the present embodiment, the specific area SA (see FIG. 22) corresponding to the face area FA on which the position adjustment has been executed is directly set as the initial evaluation specific area ESA(0). It should be noted that the evaluation specific areas ESA in the tilt adjustment of the face area FA is never divided into two, namely right and left areas in contrast to the case with the specific areas SA in the position adjustment of the face area FA. The uppermost stage of FIG. 24 shows the initial evaluation specific area ESA(0) thus set.

In the S522 (FIG. 23), the face area adjustment section 230 sets a plurality of evaluation directions and the evaluation specific areas ESA corresponding respectively to the evaluation directions. The plurality of evaluation directions is set as the directions representing the alternatives of the adjustment angles for the tilt adjustment. In the present embodiment, a plurality of evaluation direction lines EL having angles with the reference line RL within a predetermined range is set, and the direction parallel to the evaluation direction line is set as the evaluation direction. As shown in FIG. 24, the straight lines defined by rotating the reference line RL around the center point (the center of gravity) CP of the initial evaluation specific area ESA(0) counterclockwise and clockwise by a predetermined angle α are set as the plurality of evaluation direction lines EL. It should be noted that the evaluation direction line EL having an angle φ with the reference line RL is described as EL(φ).

In the present embodiment, the predetermined range of the angles formed between the evaluation direction lines EL and the reference line RL described above is set to ±20 degrees. Here, in the present specification, the rotational angle in the case in which the reference line RL is rotated clockwise is described as a positive value, and the rotational angle in the case in which the reference line RL is rotated counterclockwise is described as a negative value. The face area adjustment section 230 rotates the reference line RL counterclockwise and clockwise while increasing the rotational angle, like α, 2α, . . . , within 20 degrees, thus setting the evaluation direction lines EL. FIG. 24 shows the evaluation direction lines EL (EL(−α) EL(−2α), and EL(α)) defined by rotating the reference line RL −α degree, −2α degree, and α degree, respectively. It should be noted that the reference line RL can also be described as the evaluation direction line EL(0).

The evaluation specific areas ESA corresponding respectively to the evaluation direction lines EL representing the evaluation directions are areas obtained by rotating the initial evaluation specific area ESA(0) around the center point CP with the same rotational angles used when setting the evaluation direction lines EL. The evaluation specific area ESA corresponding to the evaluation direction line EL(φ) is described as the evaluation specific area ESA(φ). FIG. 24 shows the evaluation specific areas ESA (ESA(−α), ESA(−2α), and ESA(α)) corresponding respectively to the evaluation direction lines EL (EL(−α), EL(−2α), and EL(α)). It should be noted that it is assumed that the initial evaluation specific area ESA(0) is also treated as one of the evaluation specific areas ESA.

In the S523 (FIG. 23), the face area adjustment section 230 calculates the evaluation values based on the pixel values of the image in the evaluation specific area ESA for each of the plurality of evaluation directions thus set. In the present embodiment, the average value of the R-values is used as the evaluation value in the tilt adjustment of the face area FA similarly to the case with the evaluation value in the position adjustment of the face area FA described above. The face area adjustment section 230 calculates the evaluation values for a plurality of evaluation positions along the evaluation direction.

The calculation method of the evaluation value is the same as the calculation method of the evaluation value in the position adjustment of the face area FA described above. Specifically, as shown in FIG. 24, the face area adjustment section 230 sets the target pixel specifying lines PL1 through PLn perpendicular to the evaluation direction line EL, selects the evaluation target pixels TP for each of the target pixel specifying lines PL1 through PLn, and calculates the average value of the R-values of the evaluation target pixels TP thus selected.

The method of setting the target pixel specifying lines PL and the method of selecting the evaluation target pixels TP in each of the evaluation specific area ESA are substantially the same as the methods in the position adjustment of the face area FA shown in FIGS. 18, 19A, and 19B although there is a difference therebetween in whether or not the area is divided laterally. It should be noted that similarly to the case with the position adjustment of the face area FA, it is also possible to eliminate some (e.g., 0.75 k pixels with relatively large R-values out of k evaluation target pixels TP) of the evaluation target pixels TP thus selected from the target of calculation of the evaluation value. The right part of FIG. 24 shows the distribution of the evaluation values thus calculated along the evaluation direction line EL in each of the evaluation directions.

It should be noted that since the target pixel specifying lines PL are the lines perpendicular to the evaluation direction line EL, it is possible to express that the evaluation values are calculated with respect to a plurality of positions (evaluation positions) along the evaluation direction line EL. Further, the evaluation values can be expressed as the values for representing a characteristic of the distribution of the pixel values along the direction perpendicular to the evaluation direction line EL with respect to each of the evaluation positions.

In the S524 (FIG. 23), the face area adjustment section 230 determines the adjustment angle used for tilt adjustment of the face area FA. The face area adjustment section 230 calculates the variance of the evaluation values calculated in the S523 along the evaluation direction line EL for each of the evaluation directions, and selects the evaluation direction with the maximum variance value. Then, the face area adjustment section 230 determines the angle formed between the evaluation direction line EL corresponding to the selected evaluation direction and the reference line RL as the adjustment angle used for the tilt adjustment.

Figure 25:
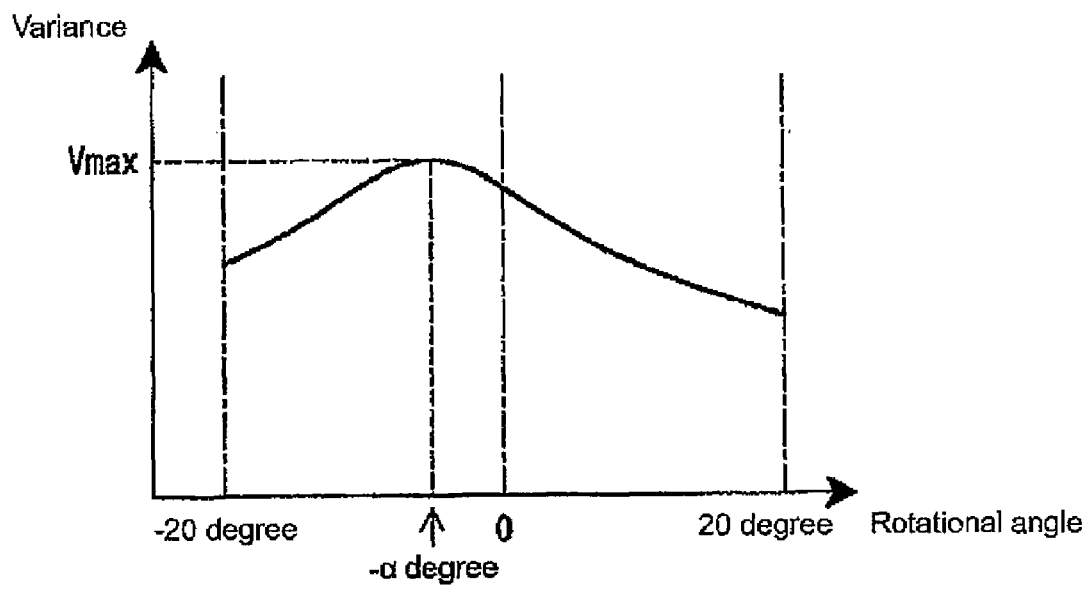
FIG. 25 is an explanatory diagram showing an example of a result of the calculation of the variance of the evaluation values in each evaluation direction.

FIG. 25 is an explanatory diagram showing an example of a result of the calculation of the variance of the evaluation values in each of the evaluation directions. In the example shown in FIG. 25, the variance takes the maximum value of Vmax in the evaluation direction with the rotational angle of −α degree. Therefore, −α degree, namely the rotational angle of α degree in the counterclockwise direction is determined as the adjustment angle used for the tilt adjustment of the face area FA.

The reason that the angle corresponding to the evaluation direction with the maximum variant value of the evaluation values is determined as the adjustment angle used for the tilt adjustment will be explained. As shown in the second uppermost stage of FIG. 24, in the evaluation specific area ESA(−α) with the rotational angle of −α, the images of the center portions (the black eye portions) of the right and left eyes are arranged to be aligned in a direction roughly parallel to the target pixel specifying line PL (namely the direction perpendicular to the evaluation direction line EL). Further, on this occasion, the images of the right and left eyebrows are also arranged to be aligned in a direction roughly perpendicular to the evaluation direction line EL. Therefore, the evaluation direction corresponding to the evaluation direction line EL on this occasion is conceivably the direction roughly representing the tilt of the face image. On this occasion, the images of the eyes and eyebrows generally having small R-values and the image of the skin portion generally having large R-values have the positional relationship in which the both images overlap with each other along the direction of the target pixel specifying line PL in a small part. Therefore, the evaluation values in the positions of the images of the eyes and eyebrows become relatively small, and the evaluation values in the position of the image of the skin portion become relatively large. Therefore, as shown in FIG. 24, the distribution of the evaluation values along the evaluation direction line EL becomes a distribution with a relatively large variation (the large amplitude), thus the variance value becomes large.

On the other hand, as shown in the uppermost stage, the third uppermost stage, and the fourth uppermost stage of FIG. 24, in the evaluation specific areas ESA(0), ESA(−2α), and ESA(α) with the rotational angles of 0 degree, −2α degree, and α degree, respectively, the images of the center portions of the right and left eyes and the images of the right and left eyebrows are not aligned in the direction perpendicular to the evaluation direction line EL, and are in a shifted arrangement. Therefore, the evaluation direction corresponding to the evaluation direction line EL on this occasion does not represent the tilt of the face image. On this occasion, the images of the eyes and eyebrows and the image of the skin portion have the positional relationship in which the both images overlap with each other along the direction of the target pixel specifying line PL in a large part. Consequently, as shown in FIG. 24, the distribution of the evaluation values along the evaluation direction line EL becomes a distribution with a relatively small variation (the small amplitude), thus the variance value becomes small.

As described above, in the case in which the evaluation direction is close to the direction of the tilt of the face image, the variance value of the evaluation values along the evaluation direction line EL becomes large, and in the case in which the evaluation direction is far from the direction of the tilt of the face image, the variance value of the evaluation values along the evaluation direction line EL becomes small. Therefore, by determining the angle corresponding to the evaluation direction with the maximum variance value of the evaluation values as the adjustment angle used for the tilt adjustment, it becomes possible to realize the tilt adjustment of the face area FA for fitting the tilt of the face area FA to the tilt of the face image.

It should be noted that in the present embodiment, in the case in which the calculation result of the variance of the evaluation values has the maximum value at the critical values of the range of the angle, namely at the angle of −20 degree or 20 degree, since it is conceivable that there is a strong possibility that the tilt of the face is not accurately evaluated, it is arranged to eliminate the tilt adjustment of the face area FA.

Further, in the present embodiment, the adjustment angle thus determined is compared with the rough tilt angle RI calculated in the position adjustment of the face area FA described above. In the case in which the difference between the adjustment angle and the rough tilt angle RI is greater than a predetermined threshold value, since it is conceivable that some error has occurred in the evaluation or the determination of the position adjustment or the tilt adjustment of the face area FA, it is arranged to eliminate the position adjustment and the tilt adjustment of the face area FA.

Figure 26:
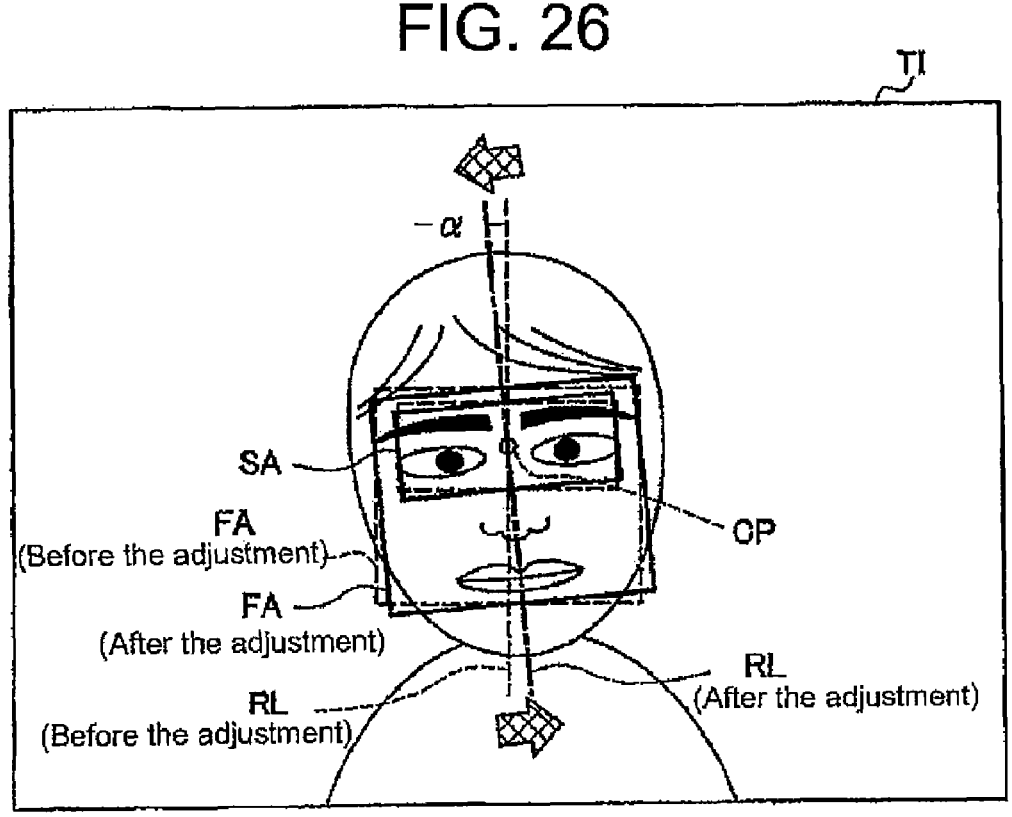
FIG. 26 is an explanatory diagram showing an example of a method of adjusting the tilt of the face area FA.

In the S525 (FIG. 23), the face area adjustment section 230 executes the tilt adjustment of the face area FA. FIG. 2G is an explanatory diagram showing an example of a method of adjusting the tilt of the face area FA. The tilt adjustment of the face area FA is performed by rotating the face area FA the adjustment angle thus determined in the S524 around the center point CP of the initial evaluation specific area ESA(0). In the example shown in FIG. 26, by rotating the unadjusted face area FA illustrated with the broken lines a degree counterclockwise, the adjusted face area FA illustrated with the solid lines is set.

Figure 27:
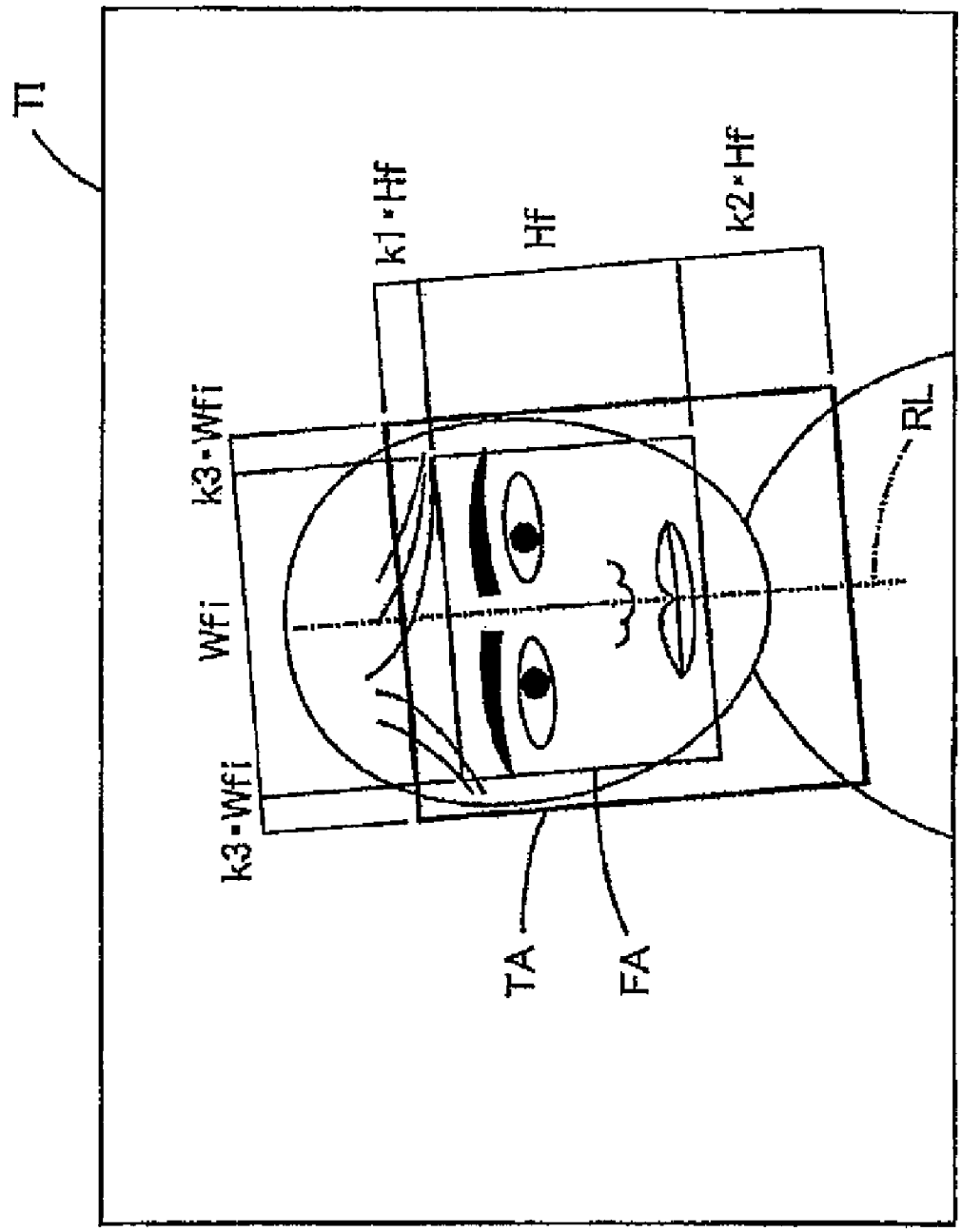
FIG. 27 is an explanatory diagram showing an example of a method of setting a transformation area TA.

In the S530 (FIG. 15) after the tilt adjustment of the face area FA has been completed, the transformation area setting section 240 (FIG. 2) sets the transformation area TA. The transformation area TA is an area on the target image TI, and to be a target of the image transformation process for the face shape correction. FIG. 27 is an explanatory diagram showing an example of a method of setting the transformation area TA. As shown in FIG. 27, in the present embodiment, the transformation area TA is set as an area obtained by expanding (or shrinking) the face area FA in the direction (the height direction) parallel to the reference line RL and in the direction (the lateral direction) perpendicular to the reference line RL. Specifically, assuming that the size of the face area FA in the height direction is Hf, and the size thereof in the width direction is Wfi, the area obtained by expanding the face area FA k1·Hf upward, k2·Hf downward, and k3·Wfi rightward and leftward, respectively, is set as the transformation area TA. It should be noted that k1, k2, and k3 are predetermined coefficients.

By thus setting the transformation area TA, the reference line RL, which is a straight line parallel to the border lines of the face area FA in the height direction, becomes a straight line also parallel to the border lines of the transformation area TA in the height direction. Further, the reference line RL becomes a straight line dividing the width of the transformation area TA into two equal parts.

As shown in FIG. 27, the transformation area TA is set as an area roughly including the image corresponding to the range from the chin to the forehead with respect to the height direction, and including the image of the right and left cheeks with respect to the width direction. In other words, in the present embodiment, the coefficients k1, k2, and k3 described above are set previously based on the relationship with the sizes of the face area FA so that the transformation area TA becomes the area roughly including the images in such an extent.

In the S600 (FIG. 8), the transformation process targeting the transformation area TA thus set as described above is executed. In the present embodiment, the transformation process is performed based on the ratio information acquired in the S120 described above so as to shrink the size of the image in the width direction (the direction perpendicular to the reference line RL) in the transformation area TA.

Figure 28:
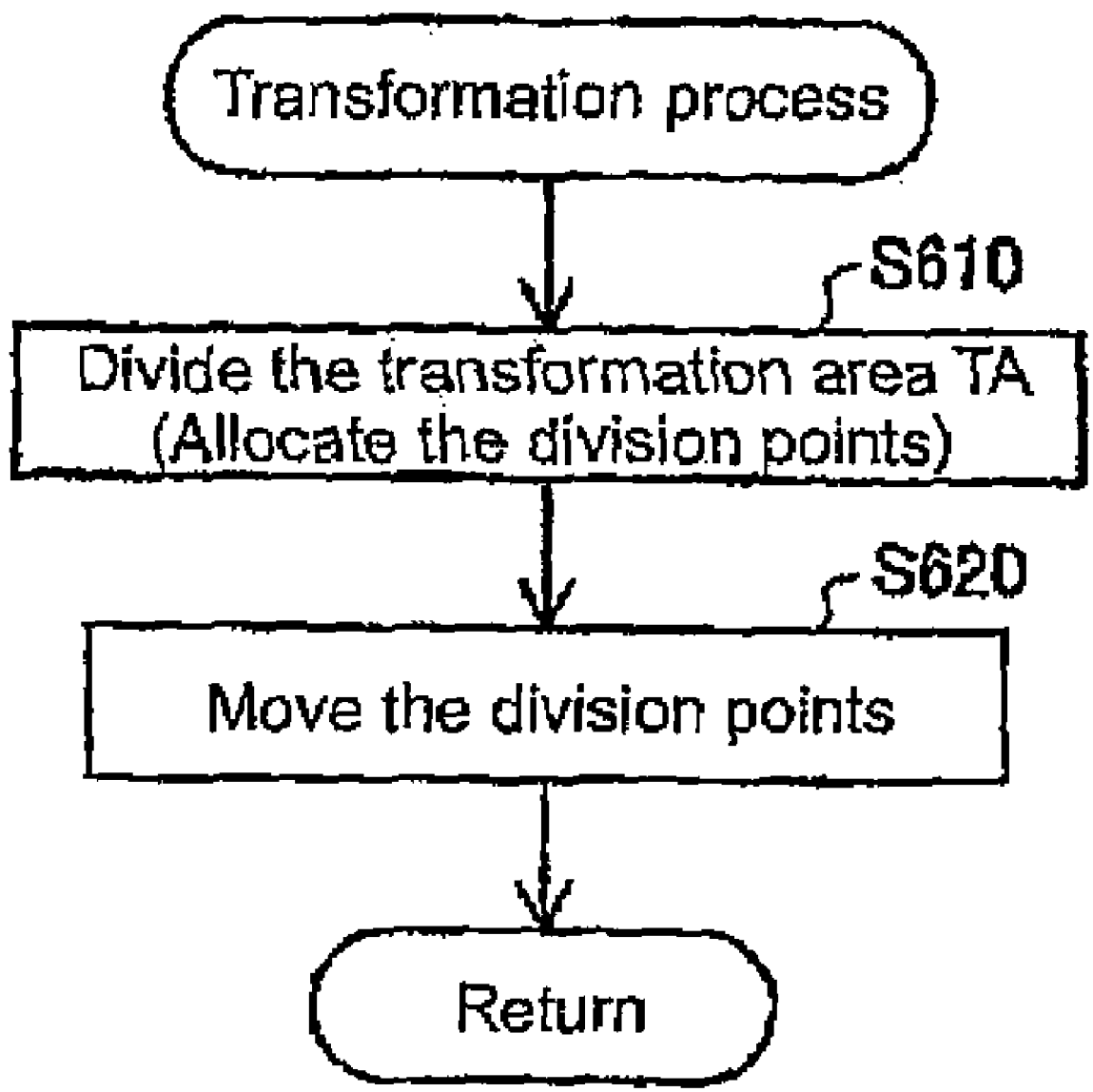
FIG. 28 is an example of a flowchart showing flow of a transformation process.

FIG. 28 is a flowchart showing flow of a transformation process. In the S610, the transformation area dividing section 250 (FIG. 2) divides the transformation area TA into a plurality of sub-areas.

Figure 29:
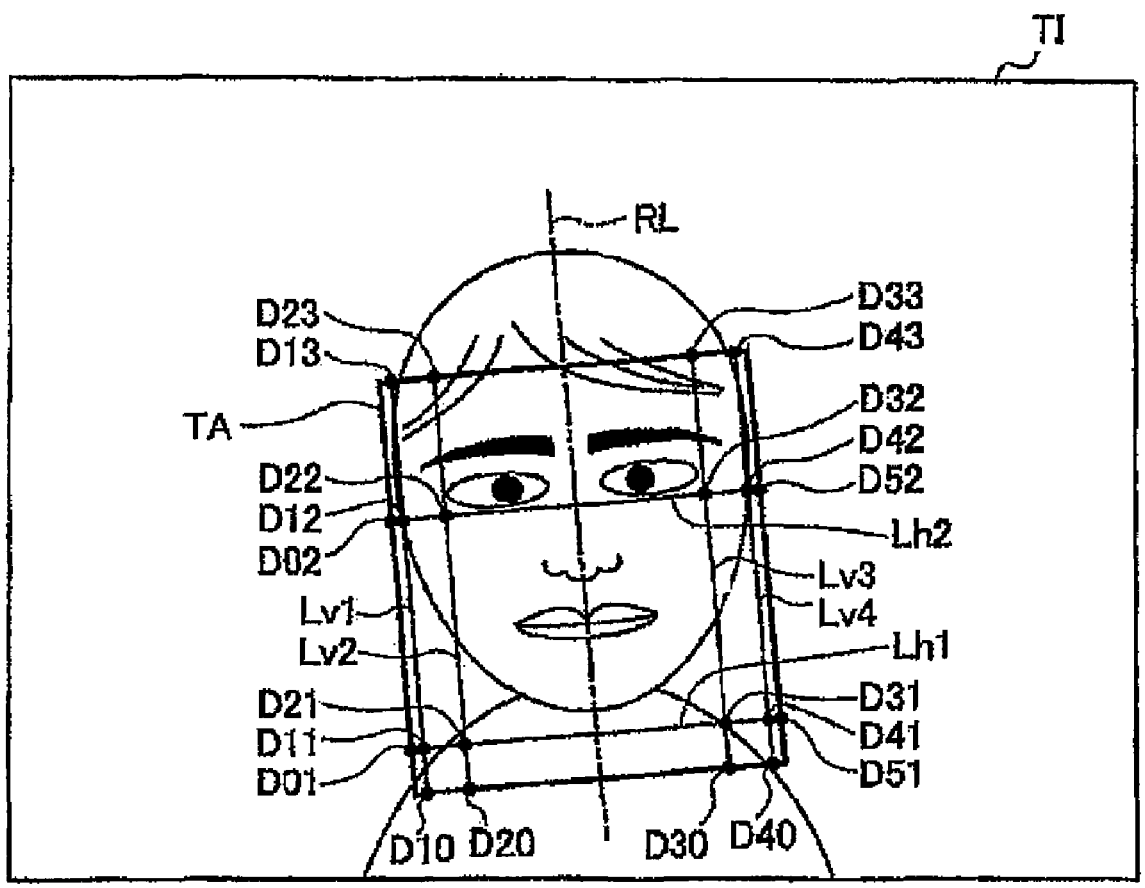
FIG. 29 is an explanatory diagram showing an example of a method of dividing the transformation area TA into sub-areas.

FIG. 29 is an explanatory diagram showing an example of a method of dividing the transformation area TA into the sub-areas. The transformation area dividing section 250 allocates a plurality of division points D in the transformation area TA, and divides the transformation area TA into the plurality of sub-areas using straight lines connecting the division points D. An aspect (the number and positions of the division points D) of the division points D is defined by the division point allocation pattern table 410 (FIG. 2). The transformation area dividing section 250 looks up the division point allocation pattern table 410 to allocates the division points D.

As shown in FIG. 29, as an example, the division points D are allocated at the intersections of horizontal divisional lines Lh and vertical divisional lines Lv, and the intersections of the horizontal divisional lines Lh, the vertical divisional lines Lv and the closure lines of the transformation area TA. Here, the horizontal divisional lines Lh and the vertical divisional lines Lv are the lines forming a reference for allocating the division points D in the transformation area TA. In the allocation of the division points D shown in FIG. 29, there are provided two horizontal divisional lines Lh perpendicular to the reference line RL and four vertical divisional lines Lv parallel to the reference line RL. The two horizontal divisional lines Lh are referred to as Lh1, Lh2 in order from the bottom of the transformation area TA. Further, the four vertical divisional lines Lv are referred to as Lv1, Lv2, Lv3, Lv4 in order from the left of the transformation area TA.

The horizontal divisional line Lh1 is disposed below the image of the chin in the transformation area TA, and the horizontal divisional line Lh2 is disposed somewhere directly below the image of the eye. Further, the vertical divisional lines Lv1 and Lv4 are disposed outside the image of the cheek lines, and the vertical divisional lines Lv2 and Lv3 are disposed outside the image of the tail of eyes. It should be noted that the allocation of the horizontal divisional lines Lh and the vertical divisional lines Lv is performed along the correspondence with the size of the transformation area TA set previously so that the positional relationship between the horizontal divisional lines Lh, the vertical divisional lines Lv and the images becomes the positional relationship described above.

In accordance with the allocation of the horizontal divisional lines Lh and the vertical divisional lines Lv described above, the division points D are disposed at the intersections of the horizontal divisional lines Lh and the vertical divisional lines Lv, and the intersections of the horizontal divisional lines Lh, the vertical divisional lines Lv and the closure lines of the transformation area TA. As shown in FIG. 29, it is assumed that the division points D disposed on the horizontal divisional line Lhi (i is one of the numerical values of 1 and 2) are referred to as D0$i$, D1$i$, D2$i$, D3$i$, D4$i$, D5$i$ in order from the left. For example, the division points D disposed on the horizontal divisional line Lh1 are referred to as D01, D11, D21, D31, D41, D51, respectively. Similarly, it is assumed that the division points D disposed on the vertical divisional line Lhj (j is one of the numerical values of 1, 2, 3, and 4) are referred to as Dj0, Dj1, Dj2, Dj3 in order from the bottom. For example, the division points D disposed on the vertical divisional line Lv1 are referred to as D10, D11, D12, D13, respectively.

It should be noted that as shown in FIG. 29, in the present embodiment, the allocation of the division points D is arranged to be symmetrical with respect to the reference line RL.

The transformation area dividing section 250 divides the transformation area TA into the plurality of sub-areas by the straight lines (i.e., the horizontal divisional lines Lh and the vertical divisional lines Lv) connecting the division points D thus allocated. In the present embodiment, as shown in FIG. 29, the transformation area TA is divided into fifteen rectangular sub-areas.

It should be noted that in the present embodiment, since the allocation of the division points D is determined in accordance with the number and the positions of the horizontal divisional lines Lh and the vertical divisional lines Lv, it is possible to rephrase the above that the division point allocation pattern table 410 defines the number and the positions of the horizontal divisional lines Lh and the vertical divisional lines Lv.

In the S620 (FIG. 28), the divisional area transforming section 260 (FIG. 2) executes the transformation process of the image targeting the transformation area TA of the target image TI. The transformation process by the divisional area transforming section 260 is performed by moving the positions of the division points D allocated in the transformation area TA in the S610 to transform the sub-areas.

Figure 30:
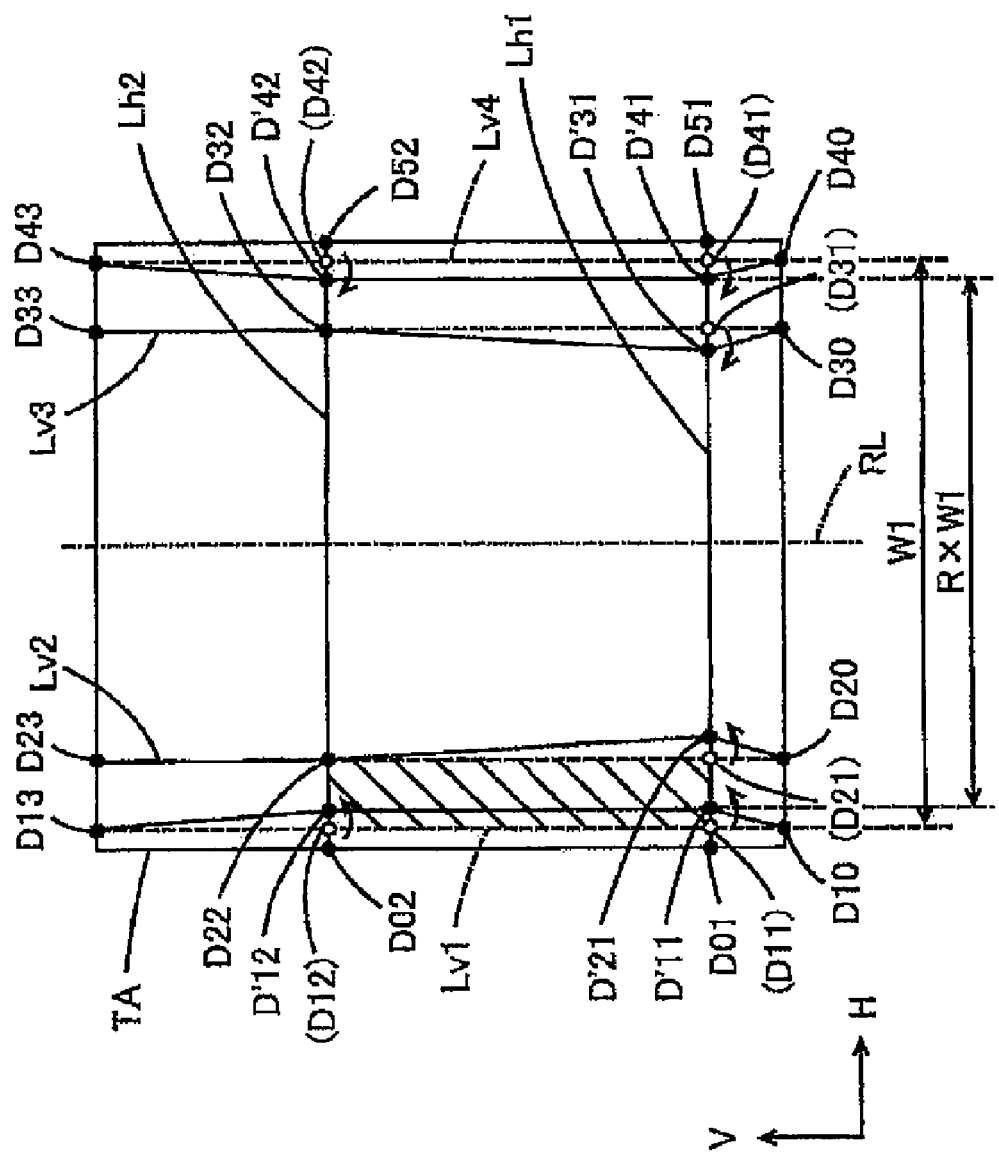
FIG. 30 is an explanatory diagram showing an example of movement of the positions of division points D.

FIG. 30 is an explanatory diagram showing an example of movement of the positions of division points D. In the present embodiment, the divisional area transforming section 260 modifies the distances in the H direction (the direction perpendicular to the reference line RL) between the division points having symmetrical relationships with respect to the reference line RL based on the ratio (hereinafter referred to as a ratio R) represented by the ratio information obtained in the S120 described above. For example, assuming that the distance (the number of pixels) in the H direction between the division points D11 and D41 in the symmetrical relationship with respect to the reference line RL is W1, the division points D11, D41 are moved along the H direction towards the reference line RL so that the distance (the number of pixels) in the H direction between the division point D11 thus moved (hereinafter referred to as D'11) and the division point D41 thus moved (hereinafter referred to as D'41) becomes R·W1. Similarly, pair of division points D21 and D31 and pair of division points D12 and D42 in the symmetrical relationships with respect to the reference line RL are moved respectively so that the distance in the H direction between each of the pairs of points is shrunk in accordance with the ratio R described above. It should be noted that in the present embodiment, movement of the division points D in the direction (the V direction) parallel to the reference line RL is not performed.

In the present embodiment, it is arranged that the positions of the division points D located on the closure lines of the transformation area TA (e.g., the division points D10 and so on shown in FIG. 29) is not moved in order for preventing the boundary between the images in the inside and the outside of the transformation area TA from being unnatural. In FIG. 30, the division points before the movement are represented by open circles, and the division points after the movement or out of the target of the movement are represented by filled circles. The division points D after the movement are distinguished by adding "'" to the names thereof.

It should be noted that in the present embodiment the movement is performed so that the all of the combinations of the two division points D having the symmetrical positional relationship with respect to the reference line RL (e.g., the combination of the division points D11 and D41) maintain the symmetrical positional relationship with respect to the reference line RL after the movement of the division points D.

The divisional area transforming section 260 executes the transformation process of the image on each of the sub-areas composing the transformation area TA so that the image in the sub-area in the condition before the position movement of the division points D becomes the image in the sub-area newly defined by the position movement of the division points D. For example, in FIG. 30, the image in the sub-area (the sub-area illustrated with hatching) having the division points D11, D21, D22, and D12 as the apexes is transformed into the image in the sub-area having the division points D'11, D'21, D22, and D'12 as the apexes.

Figure 31:
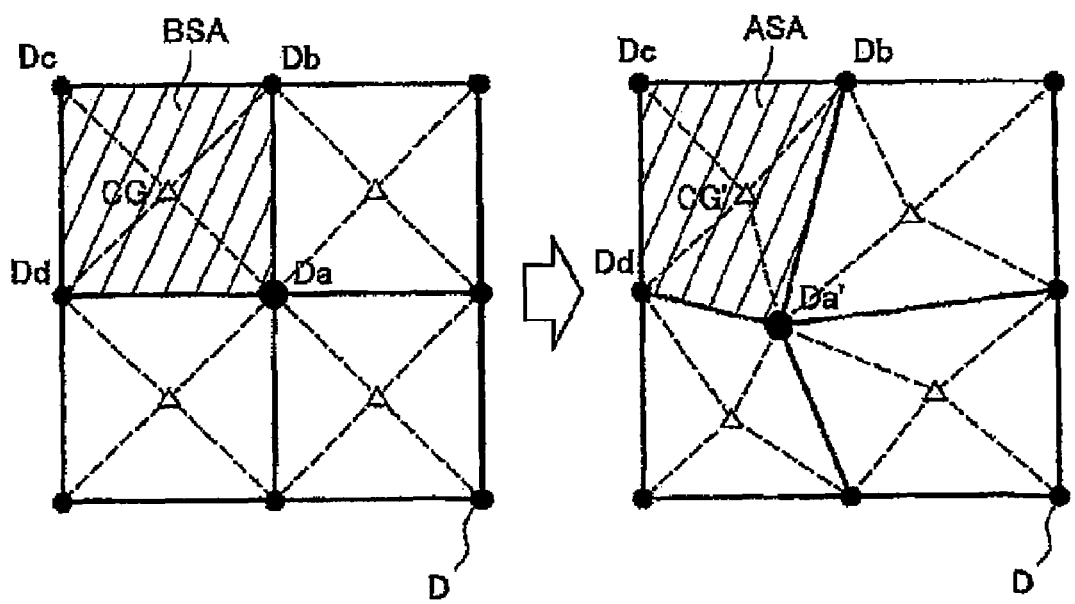
FIG. 31 is an example of an explanatory diagram showing a concept of a method of processing transformation of an image by a divisional area transforming section 260.

FIG. 31 is an explanatory diagram showing a concept of a method of processing of transformation of an image by a divisional area transforming section 260. In FIG. 31, the division points D are represented by filled circles. In FIG. 31, in order for simplifying the explanation, the condition of four sub-areas before the position movement of the division points D is shown in the left part, and the condition of the four sub-areas after the position movement of the division points D is shown in the right part, respectively. In the example shown in FIG. 31, the division point Da at the center is moved to the position of the division point Da', and the positions of the other division points are not moved. Thus, for example, the image in the rectangular sub-area (hereinafter also referred to as "untransformed target sub-area BSA") having the division points Da, Db, Dc, and Dd before the movement of the division points D as the apexes is transformed into the image in the rectangular sub-area (hereinafter also referred to as "transformed target sub-area ASA") having the division points Da', Db, Dc, and Dd before the movement of the division points D as the apexes.

In the present embodiment, the rectangular sub-area is divided into four triangle areas using the center of gravity CG of the sub-area, and the transformation process of the image is executed by the triangle area. In the example shown in FIG. 31, the untransformed target sub-area BSA is divided into four triangle areas having the center of gravity CG of the untransformed target sub-area BSA as one of the apexes thereof. Similarly, the transformed target sub-area ASA is divided into four triangle areas having the center of gravity CG' of the transformed target sub-area BSA as one of the apexes thereof. Further, the transformation process of the image is executed for each pair of the triangle areas corresponding to each other in both of the conditions before and after the movement of the division point Da. For example, the image in the triangle area in the untransformed target sub-area BSA having the division points Da, Dd, and the center of gravity CG as the apexes is transformed into the image in the triangle area in the transformed target sub-area ASA having the division points Da', Dd, and the center of gravity CG' as the apexes.

Figure 32:
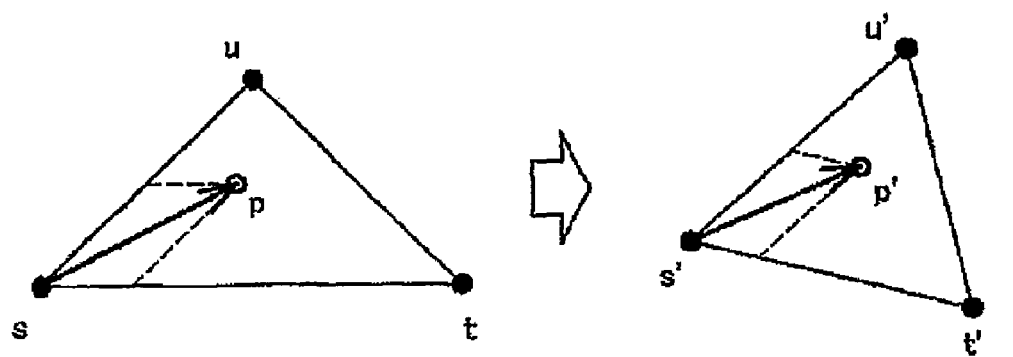
FIG. 32 is an example of an explanatory diagram showing a concept of a method of processing transformation of an image in a triangle area.

FIG. 32 is an explanatory diagram showing a concept of a method of processing the transformation of an image in the triangle area. In the example shown in FIG. 32, the image in the triangle area stu having the points s, t, and u as the apexes is transformed into the image in the triangle area s't'u' having the points s', t', and u' as the apexes. The transformation of the image is performed by calculating the position in the image in the untransformed triangle area stu corresponding to the position of a certain pixel in the image in the transformed triangle area s't'u', and replacing the pixel value in the untransformed image at the position thus calculated with the pixel value of the transformed image.

For example, in FIG. 32, it is assumed that the position of the target pixel p' in the image in the transformed triangle area s't'u' corresponds to the position p in the image in the untransformed triangle area stu. The calculation of the position p is performed as described below. Firstly, coefficients m1 and m2 for expressing the position of the target pixel p' with sum of a vector s't' and a vector s'u' are calculated.

$$\overrightarrow{s'p'} = m1 \cdot \overrightarrow{s't'} + m2 \cdot \overrightarrow{s'u'} \quad (4)$$

Subsequently, the sum of a vector st and a vector su in the untransformed triangle area stu is calculated along the following formula 5 using the coefficients m1 and m2 thus calculated, thereby obtaining the position p.

$$\overrightarrow{sp} = m1 \cdot \overrightarrow{st} + m2 \cdot \overrightarrow{su} \quad (5)$$

In the case in which the position pin the untransformed triangle area stu matches the pixel center position of the untransformed image, the pixel value of the pixel is set as the pixel value of the transformed image. On the other hand, in the case in which the position p in the untransformed triangle area stu becomes the position shifted from the pixel center position of the untransformed image, the pixel value at the position p is calculated by an interpolation operation such as bi-cubic convolution using pixel values of the peripheral pixels, and the pixel value thus calculated is used as the pixel value of the transformed image.

By calculating the pixel values as described above for every pixel in the image in the transformed triangle area s't'u', the image transformation process from the image in the triangle area stu to the image in the triangle area s't'u' can be performed. The divisional area transforming section 260 defines the triangle areas to execute the transformation process as described above on each of the sub-areas composing the transformation area TA shown in FIG. 30, thereby performing the image transformation process in the transformation area TA.

Hereinafter, an aspect of the face shape correction of the present embodiment will be explained in further detail. In the present embodiment, the positions of the division points D (D11, D12) disposed on the vertical divisional line Lv1 are moved rightward with respect to the direction (the H direction) perpendicular to the reference line RL, and the positions of the division points D (D41, D42) disposed on the vertical divisional line Lv4 are moved leftward (see FIG. 30). Further, out of the two division points D disposed on the vertical divisional line Lv2, the position of the division point D (D21) disposed on the horizontal divisional line Lh1 is moved rightward, while out of the two division points D disposed on the vertical divisional line Lv3, the position of the division point D (D31) disposed on the horizontal divisional line Lh1 is moved leftward (see FIG. 30). Therefore, the images located on the left of the vertical divisional line Lv1 are expanded rightward with respect to the H direction, while the images located on the right of the vertical divisional line Lv4 are expanded leftward. Further, the images located between the vertical divisional line Lv1 and the vertical divisional line Lv2 are shrunk or moved rightward with respect to the H direction, and the images located between the vertical divisional line Lv3 and the vertical divisional line Lv4 are shrunk or moved leftward with respect to the H direction. Further, the images located between the vertical divisional line Lv2 and the vertical divisional line Lv3 are shrunk around the position of the reference line RL with respect to the H direction.

As described above, the vertical divisional lines Lv1 and Lv4 are disposed outside the image of the cheek lines, and the vertical divisional lines Lv2 and Lv3 are disposed outside the image of the tail of eyes. Therefore, according to the face shape correction described above, the images of the outer portions of the tail of eyes out of the image of the face are shrunk as a while in the H direction. As a result, the shape of the face in the image becomes thin as a whole in the width direction of the face.

According to the method of allocating the horizontal divisional line Lh2 and the vertical divisional lines Lv2 and Lv3 described above, the sub-area having the division points D22, D32, D33, and D23 as the apexes thereof becomes an area including the image of the both eyes (see FIG. 29). As shown in FIG. 30, since the division points D22 and D32 are not moved, the sub-area including the image of the both eyes is not transformed. By eliminating the transformation of the sub-area including the image of the both eyes as described above, it is arranged that the image on which the face shape correction has been executed becomes more natural and preferable.

It should be noted that in view of the circumstances that humans who observe an image of the subject receive an impression that the lateral width thereof is larger compared to the case in which the humans observe the subject directly, it is possible to move the division points D22, D32. In other words, it is also possible to arrange that the pair of division points D22, D33 are moved to shrink the distance between the both points in the H direction in accordance with the ratio R described above. Further, regarding the horizontal divisional line Lh2, it is possible to arrange that the horizontal divisional line Lh2 is disposed above the image of the eyes (e.g., the position somewhere on the eyebrows), and the division points D12, D22, D32, and D42 disposed on the horizontal divisional line Lh2 are moved as described above. By moving the division points D22, D23 towards the reference line RL, or raising the position of the horizontal divisional line Lh2, it is possible to perform the transformation for further reducing the lateral width of the face as a whole.

Figure 13:
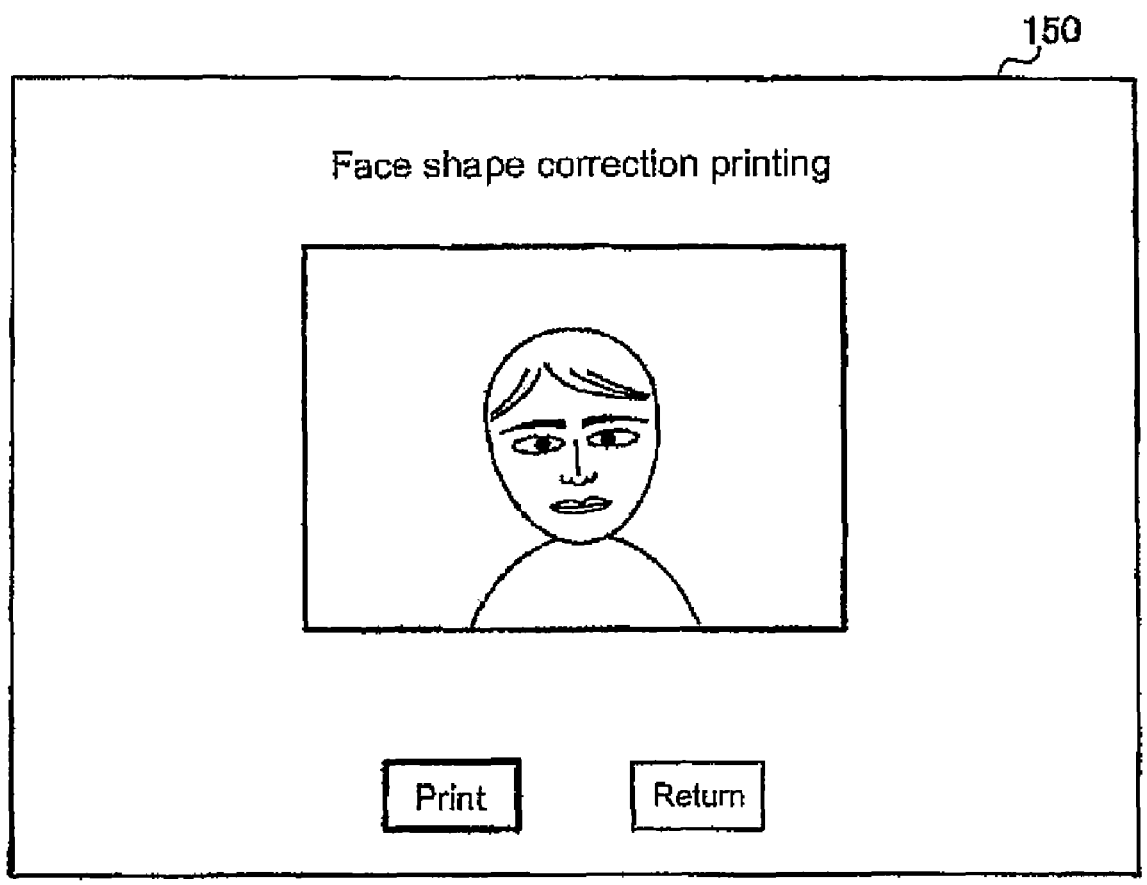
FIG. 13 is an explanatory diagram showing an example of a condition of a display section 150 on which a target image TI, on which the face shape correction is executed, is displayed.

In the S200 (FIG. 7), the face shape correction section 200 instructs the display processing section 310 to display the target image TI on which the face shape correction has been executed on the display section 150. FIG. 13 is an explanatory diagram showing an example of a condition of a display section 150 on which a target image TI, on which the face shape correction has been executed, is displayed. According to the display section 150 on which the target image TI after the face shape correction is executed thereon is displayed, the user can confirm the correction result. When the user is satisfied with the correction result and selects the "PRINT" button, the corrected image printing process (S300) described below is started. When the user is not satisfied with the correction result and selects the "RETURN" button, it is possible to display the interface panel as shown in FIG. 6 on the display section 150, for example, to allow the user to select the normal printing. It should be noted that the process in the S200 is not indispensable, and it is possible to skip the S200 and proceed to the S300 described below after the process in the S100.

In the S300 (FIG. 7), the print processing section 320 controls the printer engine 160 to perform printing of the target image TI after the face shape correction process is executed thereon, The print processing section 320 generates the print data by executing the process such as a resolution conversion process or a half-tone process on the image data of the target image TI on which the face shape correction process has been executed. The print data thus generated is supplied from the print processing section 320 to the printer engine 160, and the printer engine 160 executes printing of the target image TI. Thus, the printing of the target image TI on which the face shape correction has been executed is completed.

As described above, according to the present embodiment, the ratio between the size (the monocular sensing size SM) of the subject captured via the single eye (the lens 502) from the distance between the lens 502 and the subject (the subject distance Sd) and the size (the binocular sensing size SB) of the subject sensed by the right and left eyes of a human from the same subject distance Sd is calculated using the information of the subject distance Sd, the size of the subject, and so on when the target image TI is imaged, and the transformation process is executed so that the subject on the target image TI is shrunk in the lateral direction in accordance with the ratio thus calculated. As a result, it is possible to obtain (e.g., as a printing result) the target image including the subject having a shape extremely close to the impression a human receives when directly observing the subject.

2. Other Embodiments

In the process of the S120 (FIG. 8), the ratio information acquisition section 350 is arranged to calculate the ratio information occasionally using the various values such as the subject distance Sd, the face width Wf, and the both-eye distance information DE. It should be noted that the printer 100 can be arranged to previously have a table (a ratio information table 420) from which the ratio information corresponding to any combination of Sd and Wf described above, and acquires the ratio information in the S120 looking up the ratio information table 420.

Figure 12:
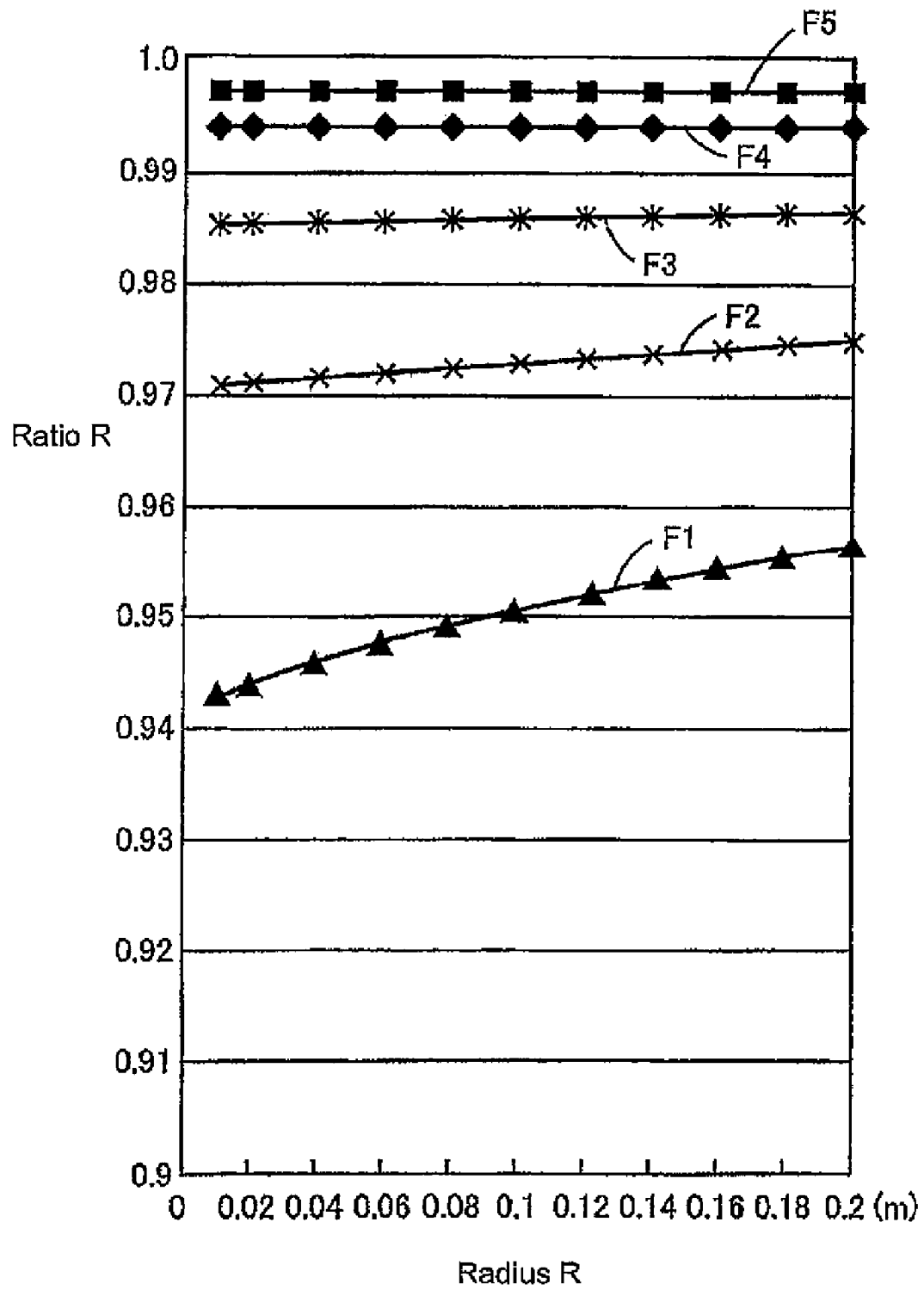
FIG. 12 is a diagram showing an example of a ratio information table 420.

FIG. 12 shows an example of the ratio information table 420. In the drawing, tables F1, F2, F3, F4, and F5 respectively defining correspondence between the radius r of the subject OB and the ratio information (the ratio R) for a plurality of values of the subject distance Sd are shown. The table F1 defines the correspondence between the radius r and the ratio R with the subject distance Sd=0.5 m, the table F2 defines the correspondence between the radius r and the ratio R with the subject distance Sd=11.0 m, the table F3 defines the correspondence between the radius r and the ratio R with the subject distance Sd=2.0 m, the table F4 defines the correspondence between the radius r and the ratio R with the subject distance Sd=5.0 m, and the table F5 defines the correspondence between the radius r and the ratio R with the subject distance Sd=10 m. Such tables F1 through F5 can previously be obtained by the calculation using the combination of various values of the radius r and the values of the subject distance Sd, and the both-eye distance information DE and the distance d1 as fixed values. Therefore, the printer 100 previously generates the ratio information table 420 formed of such tables F1 through F5 and stores the ratio information table 420 in the internal memory 120, or acquires the ratio information table 420 generated by external equipment (e.g., a computer) from the external equipment and stores in the internal memory 120.

As a result, in the S120, it becomes possible for the ratio information acquisition section 350 to obtain directly, or with necessary interpolation operation, the ratio information (the ratio R) corresponding to the subject distance Sd and the face width Wf (corresponding to the subject distance Sd and the face width Wf/2) acquired from the image file of the target image TI by looking up the ratio information table 420.

As explained above, the ratio of the binocular sensing size SB to the monocular sensing size SM is a value varying in accordance with the subject distance Sd and the size of the subject. Here, there are some cases in which one subject has regions with sizes different from each other. Therefore, it can be said that the difference between the impression received when observing an image of the subject and the impression received when observing the subject directly varies between the regions of the subject. From a viewpoint of the present invention that the image having substantially the same shape as in the impression a human receives when viewing the actual subject is generated by a transformation process, it is more preferable to perform the transformation process based on the ratio information corresponding to the sizes of the respective regions for each of the regions in the subject having sizes different from each other. Therefore, as another embodiment of the invention, the ratio information acquisition section 350 acquires different ratio information for each of the regions of the subject in the S120 described above.

In the figure as a subject, the neck is normally thinner than the face. As is obvious from the ratio information table 420 shown in FIG. 12, it can be said that the smaller the size of the subject to be the target of the observation, the smaller the ratio of the binocular sensing size SB to the monocular sensing size SM becomes. Therefore, the impression of the face and the impression of the neck received when observing the image of the figure are different from each other, and there are many cases having an impression that the neck portion of the figure is particularly thicker compared to the actual subject.

Therefore, as an example, the ratio information acquisition section 350 acquires the ratio information corresponding to the subject distance Sd and the face width Wf obtained from the image file of the target image TI, and at the same time, also acquires the ratio information corresponding to the subject distance Sd and the neck width Wn.

Regarding the value of the neck width Wn, it is possible for the printer to previously store the typical value (e.g., 120 mm) as the neck width of humans in the internal memory 120. Alternatively, it is also possible that the DSC 500 holds the typical value as the human neck width, and includes the value in the image file as the additional data in the image file generation process (FIG. 3). The ratio information acquisition section 350 retrieves the value of the neck width Wn from a predetermined area of the internal memory 120 or the image file. As a result, it becomes possible for the ratio information acquisition section 350 to acquire the ratio information (hereinafter referred to as a ratio Rn) in the case in which the neck width Wn/2 is used as the radius r of the subject OB in addition to the ratio information (hereinafter referred to as a ratio Rf) in the case in which the face width Wf/2 is used as the radius r of the subject OB by the calculation method described above or by looking up the ratio information table 420.

As described above, in the case in which the ratio Rf and the ratio Rn are obtained, the image transformation based on the ratios Rf, Rn different from each other is performed for each of the areas corresponding respectively to the regions of the subject in the transformation area TA in the transformation process in the S600. As a precondition to performing the transformation process using the ratios Rf, Rn, the transformation area TA setting process (the S530 in FIG. 15) and the division point D allocation process (the S610 in FIG. 28) are also different from those in the first embodiment as explained below.

Figure 33:
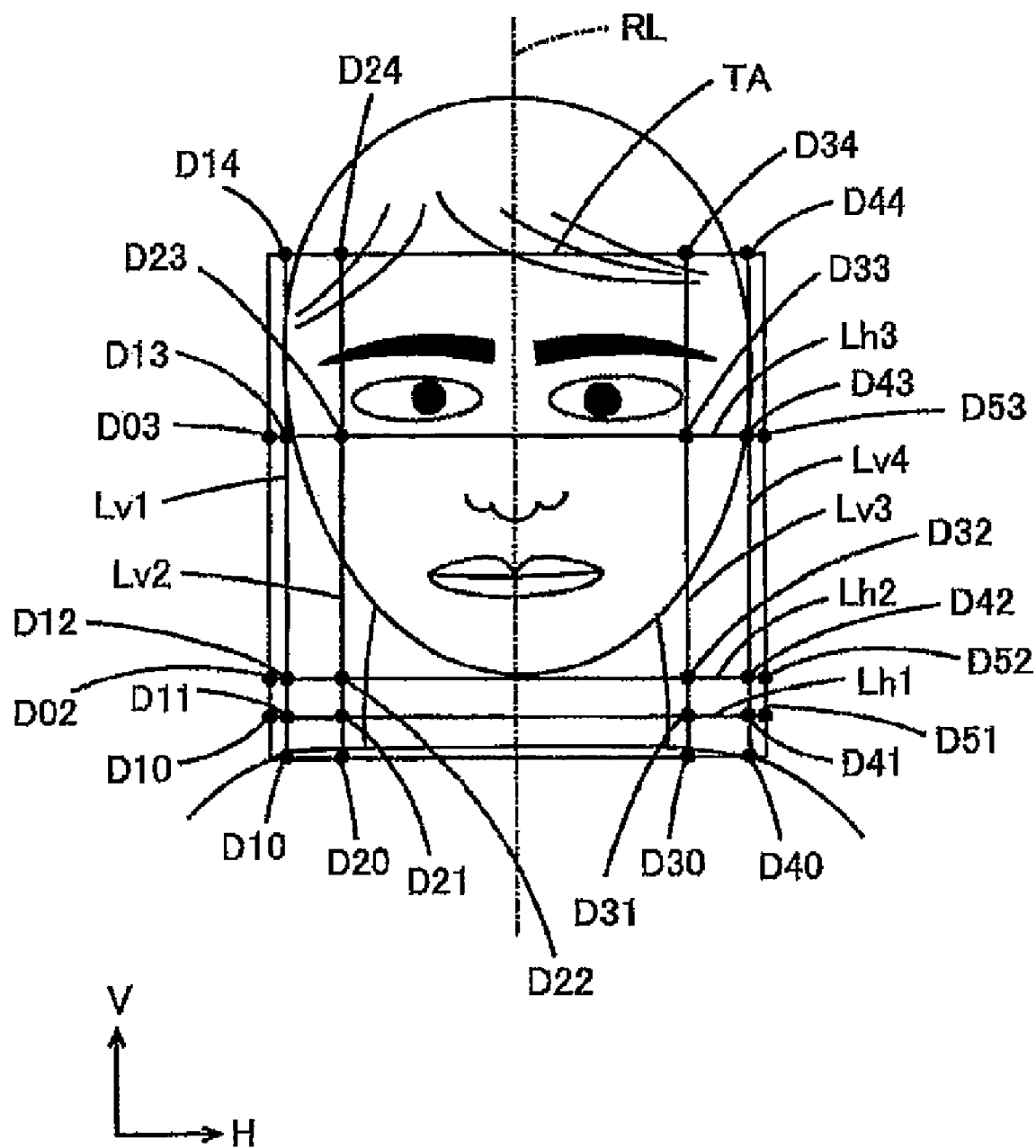
FIG. 33 is an example of an explanatory diagram showing another example of the method of setting the transformation area TA and the method of dividing the transformation area TA into the sub-areas.

FIG. 33 shows an example of the transformation area TA the transformation area setting section 240 sets in the S530 in the other embodiment. Similarly to the first embodiment, the transformation area TA in the drawing is set by expanding the size in the height direction and the size in the width direction of the face area FA in the direction parallel to the reference line RL and the direction perpendicular to the reference line RL using the coefficients k1, k2, and k3. The transformation area TA in FIG. 33 is set as an area including the image of the right and left cheeks with respect to the width direction, and the image of the range roughly from the height of the shoulder to the forehead with respect to the height direction. In other words, although the value of the coefficient k1 acting on the upward expansion of the face area FA, and the value of the coefficient k3 acting on the rightward and leftward expansion of the face area FA are the same as the values used in the first embodiment, the coefficient k2 acting on the downward expansion of the face area FA is set to the value for positioning the bottom line of the transformation area TA somewhere at the shoulder.

Further, FIG. 33 exemplifies the horizontal divisional lines Lh, the vertical divisional lines Lv, and the respective division points D the transformation area dividing section 250 sets in the S610 to the transformation area TA.

In the example shown in FIG. 33, in contrast to the example shown in FIG. 29, three horizontal divisional lines Lh1, Lh2, and Lh3 are provided in order from the bottom. The horizontal divisional line Lh2 is disposed at the image of vicinity of the tip of the chin in the transformation area TA, and the horizontal divisional line Lh3 is disposed somewhere directly below the image of the eye. Further, the horizontal divisional line Lh1 is disposed at the position between the chin and the shoulders and traversing the neck. Similarly to the example shown in FIG. 29, the vertical divisional lines Lv1 and Lv4 are disposed outside the image of the cheek lines, and the vertical divisional lines Lv2 and Lv3 are disposed outside the image of the tail of eyes. The allocation of the horizontal divisional lines Lh and the vertical divisional lines Lv is performed along the correspondence with the size of the transformation area TA set previously so that the positional relationship between the horizontal divisional lines Lh, the vertical divisional lines Lv and the images becomes the positional relationship described above.

In the other embodiment, targeting the transformation area TA provided with the division points D allocated as shown in FIG. 33, the divisional area transforming section 260 moves the division points D based on the ratios Rf or Rn in the S620.

Figure 34:
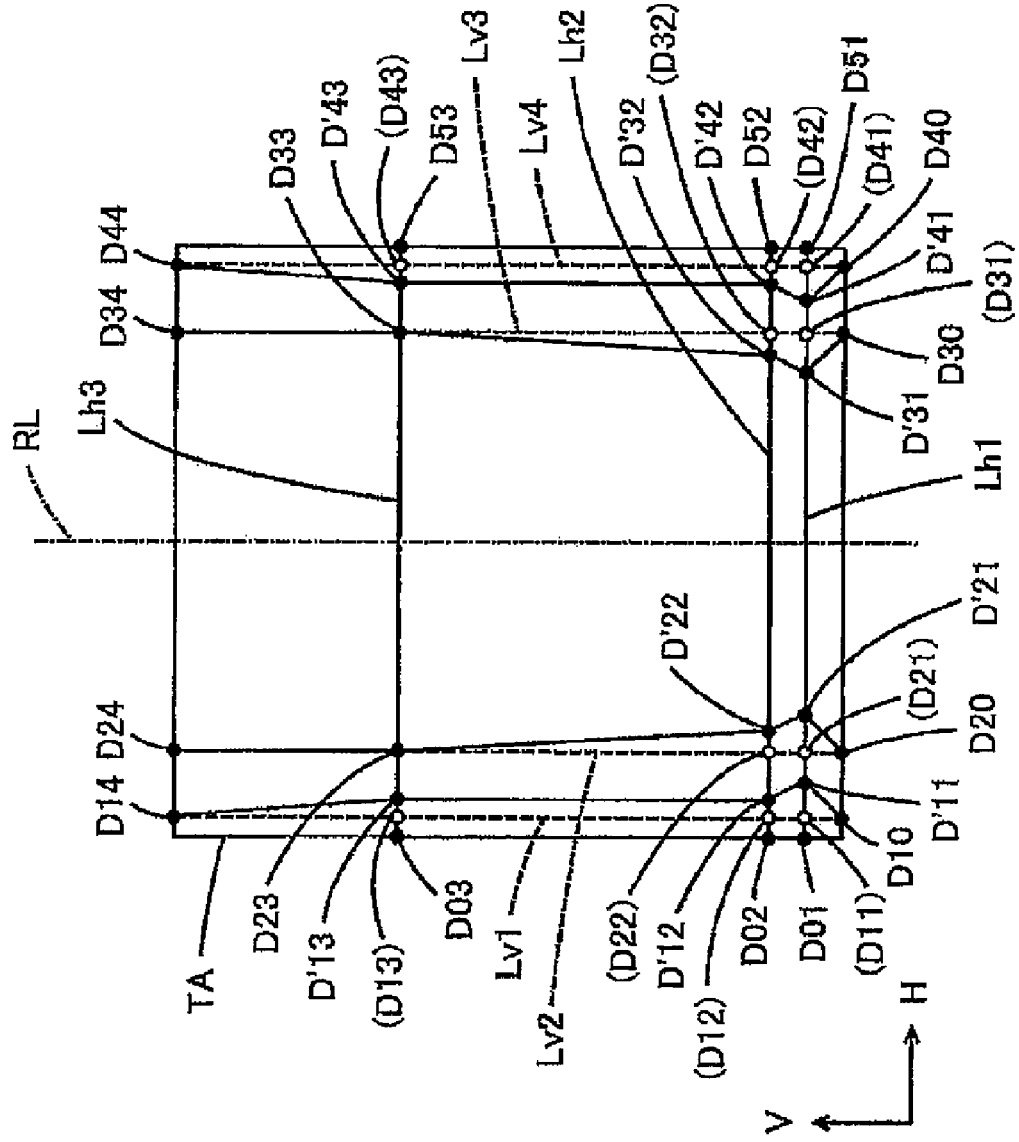
FIG. 34 is an example of an explanatory diagram showing another example of movement of the positions of the division points D.

FIG. 34 is an explanatory diagram showing an example of movement of the positions of the division points D. Also in FIG. 34, the division points before the movement are represented by open circles, and the division points after the movement or out of the target of the movement are represented by filled circles. The division points D after the movement are distinguished by adding "'" to the names thereof.

Also in the other embodiment, the divisional area transforming section 260 modifies the distance in the H direction between the division points D in the symmetrical relationship with respect to the reference line RL based on the ratio obtained in the S120, and the ratio applied thereto is varied in accordance with the height position of the division points D as the target of the movement. For example, regarding the pair of division points D12, D42 and the pair of division points D22, D32 disposed on the horizontal divisional line Lh2, and the pair of division points D13, D43 disposed on the horizontal divisional line Lh3, the movement for shrinking the distance in the H direction between the pair of points in accordance with the ratio Rf determined corresponding to the subject distance Sd and the face width Wf/2 is performed. On the other hand, regarding the pair of division points D11, D41, and the pair of division points D21, D31 disposed on the horizontal divisional line Lh1 traversing the neck, the movement for shrinking the distance in the H direction between the pair of points in accordance with the ratio Rn determined corresponding to the subject distance Sd and the neck width Wn/2 is performed. The division points D are not moved in the V direction.

Similarly to the first embodiment, the divisional area transforming section 260 executes the transformation process of the image on each of the sub-areas composing the transformation area TA so that the image in the sub-area in the condition before the position movement of the division points D becomes the image in the sub-area newly defined by the position movement of the division points D.

As described above, in the other embodiment, the ratio Rf is used for shrinking the distances between the division points D disposed on the horizontal divisional line Lh3 traversing the face and on the horizontal divisional line Lh2 traversing the area directly below the face (chin), and the ratio Rn is used for shrinking the distances between the division points D disposed on the horizontal divisional line Lh1 traversing the neck thinner than the face. Although depending on the subject distance Sd, the relationship of (ratio Rf)>(ratio Rn) is basically satisfied. Therefore, according to the transformation process of the other embodiment, the face shape and the neck shape in the image become thinner, respectively, in the width direction, and the neck becomes thinner with a higher compression ratio than in the case with the face.

As described above, by acquiring ratio information for each of the regions with different sizes from each other in the subject to be the target of transformation, and performing the transformation process for each of the regions of the subject with different sizes from each other based on the respective ratio information different from each other, it is possible to obtain the target image including the subject having an extremely close shape to that of the impression a human receives when directly observing the subject. In particular, although regarding the neck typically thinner than the face, the extent with which the viewer feels it thicker when observing the image thus imaged in comparison with the impression received when observing the actual subject is larger than in the case with the face, by adopting the configuration described above, an image not causing such uncomfortable feeling can be obtained.

It should be noted that the aspect of setting the transformation area TA, the aspect of disposing the divisional lines, and the aspect of moving the each of the division points D shown in FIGS. 33, 34 are nothing more than an example For example, it is also possible to increase the number of the horizontal divisional lines Lh compared to one shown in FIGS. 33, 34 to more finely divide the subject in the height direction, and to more finely set the amount of movement of the division points D on each of the horizontal divisional lines Lh in accordance with the size of the region corresponding to the respective one of the horizontal divisional lines Lh. Further, it is also possible to set the range of the transformation area TA expanding to the range including the entire figure. Further, it is also possible to arrange that the transformation (shrinkage) in the width direction of the regions such as face, neck, and body having the sizes (lateral widths) different from each other is performed in accordance with the respective ratios R obtained corresponding respectively to the regions.

The acquisition of the subject distance Sd by the DSC 500 can be performed as described below besides the method of estimating the subject distance Sd using the formulas 1 through 3 described above.

For example, when acquiring the preparatory image, the image generation section 610 controls the lens drive section 504 and the lens drive control section 506 to move the lens 502 so as to move the focal position gradually from the position near to the DSC 500 to the position far from the DSC 500, and acquires a plurality of preparatory images during the moving process of the focal position. The subject distance estimation section 630 measures the sharpness in the face area FA (the face area FA detected by the face area detection section 620) of each of the preparatory images. The sharpness can be obtained by, for example, measuring the spatial frequency component of the image.

Here, since an approximate distance from the lens 502 to the focal point is a value varying in accordance with each of the states (each of the positions of the lens 502 moving as described above, the table data for defining the correspondence between the distance from the lens 502 to the focal position and each of the states (each of the positions) of the lens 502 is previously stored in the internal memory 600. Further, the subject distance estimation section 630 specifies the preparatory image having the face area FA with the highest sharpness out of the plurality of preparatory images described above, and retrieves the distance (the distance from the lens 502 to the focal position) corresponding to the state (position) of the lens 502 when the specified preparatory image is acquired from the table data previously stored therein. Further, the distance thus retrieved is set as the subject distance Sd. In other words, since the preparatory image having the face area FA with the highest sharpness is conceivably the in-focus preparatory image, the distance from the lens 502 to the focal position conceivably represents the subject distance Sd.

Further, it is also possible that the information acquisition section 640 determines the value of the actual size (the face width Wf of the figure P) of the subject based on the subject distance Sd obtained in accordance with the state of the lens 502 as described above instead of acquiring as the information previously stored in the internal memory 600. Specifically, the face width Wf is determined based on the subject distance thus obtained, and the ratio of the width Wfi of the face area FA to the width Wwi of the entire image in the preparatory image. In this case, the internal memory 600 previously stores, for example, information (reference information) such as a proportion of the width of the image of the sample object to the width of the entire image in each of the results of image taking obtained by taking the images of sample objects (e.g., objects with lateral width of 1 m) with a common size from a plurality of subject distances Sd, and the value of the face width Wf of the figure P based on the reference information, the subject distance Sd thus obtained, the ratio of the width Wfi of the face area FA to the width Wwi of the entire image in the preparatory image.

The subject distance Sd thus obtained by the subject distance acquisition section 630 and the face width Wf of the figure P obtained by the information acquisition section 640 are attached to the image file as the additional data.

Although the figure (the face of the figure) is adopted above as the subject for acquiring the subject distance Sd, any subject besides the face of the figure can be adopted as the subject. It is possible to detect the subject distance Sd from the target image (preparatory image) such as ball, vehicle, architectural structure, or manufacturing equipment. Further, as the method of detecting the subject from the target image (the preparatory image), any method can be adopted.

Further, although the normal printing and the face shape correction printing can be selected in the interface panel shown in FIG. 6, it is also possible to eliminate such alternatives, and to arrange that the printing process incorporating the face shape correction is executed when the user selects the target image TI and instructs execution of printing. It should be noted that the reason that the transformation of the image in the invention is arbitrarily referred to as "face shape correction" in the embodiments described above is that in many cases the subject to be the target is a face. It is obvious, from the fact that the subject can also be ball, vehicle, architectural structure, or manufacturing equipment besides the face of the figure, that the actual process is not limited to the correction of "the face shape."

Although hereinabove the explanations are presented assuming that the DSC 500 executes the process described in the flowchart shown in FIG. 3, the printer 100 executes the process described in the flowchart shown in FIG. 7, it is also possible to arrange that the DSC performs a part of the of the process performed by the printer 100, or in reverse, it is also possible to arrange that the printer 100 performs a part of the process performed by the DSC 500.

For example, it is possible that the DSC 500 is capable of executing the process in the S100 in the flowchart shown in FIG. 7. It is assumed that the DSC 500 has a program (a face shape correction section 660, a ratio information acquisition section 670), which has the same functions as the functions of the face shape correction section 200 and the ratio information acquisition section 350 of the printer 100, stored in the internal memory 600 (see FIG. 1). In this case, the DSC 500 sets the image data in the image file generated in S850 described above to the target of the process in S100 in response to an instruction from the user, or automatically regardless of the instruction from the user. As a result, the image data having the subject in the image transformed into the shape closer to the impression the user received when directly viewing the subject can be obtained, and the DSC 500 can store the image data thus obtained in the memory card MC or the like as an image file.

Alternatively, it is also possible to arrange that the printer 100 has a program (a subject distance estimation section 330) having the same function as the function of the subject distance estimation section 630 of the DSC 500 stored in the internal memory 120 (see FIG. 2), to perform a part of the process of the DSC 500 described above.

Firstly, the printer 100 sets either one of the image files input from the outside via the memory card MC or the like as the target image TI (S110 in FIG. 8). Subsequently, the printer executes a process corresponding to the S820, S830 shown in FIG. 3 prior to the process of the S120. In other words, the face area detection section 220 detects the face area FA from the target image TI, and the subject distance estimation section 330 estimates the subject distance Sd in the target image TI.

On this occasion, the information acquisition section 340 of the subject distance estimation section 330 acquires the information necessary for calculation of the subject distance Sd using the formula 3. The information acquisition section 340 acquires the value (the number of pixels) of the width Wwi of the entire target image TI attached as metadata to the image file representing the target image TI, and calculates the value (the number of pixels) of the width Wfi of the face area FA. The information acquisition section 340 also acquires an approximate value of the face width of a typical figure stored in the internal memory 120 as the value of the face width Wf of the figure P. The information acquisition section 340 also acquires the value of the lens focal distance f and the width Wx of the imaging surface IS on the occasion of taking the image, which are included in the additional data of the image file of the target image TI. The subject distance estimation section 330 calculates (estimates) the subject distance Sd using the information acquired by the information acquisition section 340 and the formula 3. After thus acquiring the subject distance Sd, the printer 100 executes the processes on and after the S120 (note, the process in the S130 is not necessary) along the flowchart shown in FIG. 8.

The invention is not limited to the specific examples or the embodiments described above, but can be put into practice in various forms within the scope of the invention. The printer 100 is not limited to an inkjet printer, but can be a printer of other types such as a laser printer or a dye sublimation printer. Further, it is also possible to arrange that a personal computer performs apart of the image processing described above. Further, although the printer 100 is adopted above as an example of image output equipment, a projector or a monitor device can also be adopted as the image output equipment. Specifically, it is also possible that the projector or the monitor device performs the process (the printing process is eliminated) of the printer 100 described above, and projects the image data obtained finally on a screen, or displays the image data obtained finally on a monitor.

While the invention has been particularly shown and described with respect to preferred embodiment thereof, it should be understood by those skilled in the art that the foregoing and other changes in form and detail may be made therein without departing from the spirit and scope of the invention as defined in the appended claims.

What is claimed is:

1. An image processing device comprising:
    a subject detection section adapted to detect an image of a specific subject in a target image;
    a ratio information acquisition section adapted to acquire ratio information representing a ratio between a size of the subject captured via a monocular lens used for taking an image of the target image and a size of the subject sensed by both eyes; and
    a transformation processing section adapted to execute image transformation on an area including the image of the subject on the target image based on the ratio information obtained by the ratio information acquisition section.

2. The image processing device according to claim 1,
    wherein the ratio information acquisition section overlaps a left eye sensing range representing a size of the subject sensed by a left eye and a right eye sensing range representing a size of the subject sensed by a right eye so as to match a point on the left eye sensing range corresponding to a target point on the subject and a point on the right eye sensing range corresponding to the target point on the subject each other, and uses a range common to the left eye sensing range and the right eye sensing range as the size of the subject sensed by the both eyes.

3. The image processing device according to claim 2, further comprising:
    a size information acquisition section adapted to acquire a first subject size information representing an actual size of the subject; and
    a distance information acquisition section adapted to acquire subject distance information representing a distance from the monocular lens to the subject,
    wherein the ratio information acquisition section calculates the size of the subject captured via the monocular lens based on the first subject size information and the subject distance information, and calculates the left eye sensing range and the right eye sensing range based on the first subject size information, the subject distance information, and both-eye distance information defined previously and representing a distance between the left eye and the right eye.

4. The image processing device according to claim 3,
    wherein the ratio information acquisition section generates a table defining ratio information corresponding respectively to a plurality of combinations of the first subject size information and the subject distance information, and obtains the ratio information corresponding to the first subject size information acquired by the size information acquisition section and the subject distance information acquired by the distance information acquisition section by looking up the table.

5. The image processing device according to claim 3,
    wherein the distance information acquisition section acquires a second subject size information representing a size of an image of the subject in the target image to the target image and a third information capable of specifying a field angle of the target image, and estimates the subject distance information based on the first subject size information acquired by the size information acquisition section, the second subject size information, and the third information.

6. The image processing device according to claim 1,
    wherein the ratio information acquisition section acquires different ratio information between regions of the subject, and
    the transformation processing section executes the image transformation based on the different ratios between areas corresponding to the regions of the subject in the area determined as the target of the image transformation.

7. The image processing device according to claim 1,
    wherein the transformation processing section executes the image transformation so as to shrink the subject in a lateral width direction based on the ratio information.

8. The image processing device according to claim 1,
    wherein the subject detection section detects an image of a figure as the image of the specific subject.

9. An image processing method comprising:

detecting an image of a specific subject in a target image;

acquiring ratio information representing a ratio between a size of the subject captured via a monocular lens used for taking an image of the target image and a size of the subject sensed by both eyes; and executing image transformation on an area including the image of the subject on the target image based on the ratio information obtained.

10. A computer readable recording medium storing an image processing program adapted to make a computer execute a process comprising:

detecting an image of a specific subject in a target image;

acquiring ratio information representing a ratio between a size of the subject captured via a monocular lens used for taking an image of the target image and a size of the subject sensed by both eyes; and executing image transformation on an area including the image of the subject on the target image based on the ratio information obtained.

11. An image processing system comprising:
a first device including
 a monocular lens,
 a subject detection section adapted to detect an image of a specific subject in a target image captured via the monocular lens,
 an image taking section adapted to take an image of the target image captured via the monocular lens, and
 an output section adapted to output image data of the target image taken; and
a second device including
 an input section adapted to input the image data of the target image output from the first device,
 a ratio information acquisition section adapted to acquire ratio information representing a ratio between a size of the subject captured via a monocular lens and a size of the subject sensed by both eyes, and
 a transformation processing section adapted to execute image transformation on an area including the image of the subject in the image data input based on the ratio information obtained by the ratio information acquisition section.

* * * * *